US012732974B2

(12) United States Patent
Nhan et al.

(10) Patent No.: US 12,732,974 B2
(45) Date of Patent: Sep. 8, 2026

(54) DEMODULATION REFERENCE SIGNAL ALLOCATION FOR UPLINK SHARED CHANNEL FOR WIRELESS COMMUNICATION

(71) Applicant: Nokia Technologies Oy, Espoo (FI)

(72) Inventors: Nhat-Quang Nhan, Reims (FR); Marco Maso, Issy les Moulineaux (FR); Karri Markus Ranta-Aho, Espoo (FI); Pasi Eino Tapio Kinnunen, Oulu (FI); Alessio Marcone, Munich (DE)

(73) Assignee: Nokia Technologies Oy, Espoo (FI)

(*) Notice: Subject to any disclaimer, the term of this patent is extended or adjusted under 35 U.S.C. 154(b) by 830 days.

(21) Appl. No.: 18/021,196

(22) PCT Filed: Jul. 28, 2021

(86) PCT No.: PCT/EP2021/071160
§ 371 (c)(1),
(2) Date: Feb. 14, 2023

(87) PCT Pub. No.: WO2022/033876
PCT Pub. Date: Feb. 17, 2022

(65) Prior Publication Data

US 2023/0328705 A1 Oct. 12, 2023

Related U.S. Application Data

(60) Provisional application No. 62/706,418, filed on Aug. 14, 2020.

(51) Int. Cl.

| | |
|---|---|
| ***H04W 72/0453*** | (2023.01) |
| ***H04L 5/00*** | (2006.01) |
| ***H04W 72/20*** | (2023.01) |

(52) U.S. Cl.
CPC ....... *H04W 72/0453* (2013.01); *H04L 5/0012* (2013.01); *H04L 5/0051* (2013.01); *H04W 72/20* (2023.01)

(58) Field of Classification Search
None
See application file for complete search history.

(56) References Cited

U.S. PATENT DOCUMENTS

2018/0020452 A1* 1/2018 Yerramalli ........ H04W 72/0453
2018/0124815 A1* 5/2018 Papasakellariou ........................... H04W 72/1268

(Continued)

FOREIGN PATENT DOCUMENTS

EP 3432485 B1 10/2019
WO WO 2019/167939 A1 9/2019

*Primary Examiner* — Otis L Thompson, Jr.
(74) *Attorney, Agent, or Firm* — Barta Jones, PLLC

(57) ABSTRACT

A method may include receiving, by a user device from a network node in a wireless network, an indication that a plurality of frequency hop resource entities should be shifted, wherein each frequency hop resource entity is configured with a frequency allocation according to a sequence or order of frequency allocations; performing, by the user device, a shifting of the frequency hop resource entities, wherein each frequency hop resource entity includes one or more demodulation reference signal (DMRS) symbols and one or more data symbols, wherein the shifting causes each of the frequency hop resource entities to be shifted by one frequency hop resource position and to be allocated a different frequency allocation; and transmitting, by the user device to the network node, the plurality of shifted frequency hop resource entities.

17 Claims, 10 Drawing Sheets

(56) References Cited

U.S. PATENT DOCUMENTS

| | | | | |
|---|---|---|---|---|
| 2018/0249444 | A1* | 8/2018 | Sorrentino | H04W 24/08 |
| 2018/0324777 | A1* | 11/2018 | Wang | H04B 1/713 |
| 2019/0052420 | A1* | 2/2019 | Manolakos | H04L 5/0051 |
| 2019/0098580 | A1* | 3/2019 | Babaei | H04W 72/56 |
| 2020/0022127 | A1 | 1/2020 | Li et al. | |
| 2020/0106590 | A1* | 4/2020 | Bharadwaj | H04L 27/2602 |
| 2020/0154486 | A1* | 5/2020 | Cheng | H04W 74/0833 |
| 2020/0266964 | A1* | 8/2020 | Kang | H04W 72/23 |
| 2020/0328776 | A1* | 10/2020 | Scholand | H04B 1/715 |
| 2020/0412406 | A1 | 12/2020 | Moroga et al. | |
| 2021/0051727 | A1* | 2/2021 | Lei | H04L 5/0055 |
| 2021/0083751 | A1* | 3/2021 | Chen | H04B 7/0695 |
| 2021/0100004 | A1* | 4/2021 | Yang | H04L 27/2607 |
| 2022/0086873 | A1* | 3/2022 | Wong | H04W 72/0446 |
| 2022/0132533 | A1* | 4/2022 | Taherzadeh Boroujeni | H04L 5/1469 |
| 2023/0068475 | A1* | 3/2023 | Yang | H04L 5/0044 |
| 2023/0396385 | A1* | 12/2023 | Kwak | H04L 5/0094 |

* cited by examiner

Figure 6:
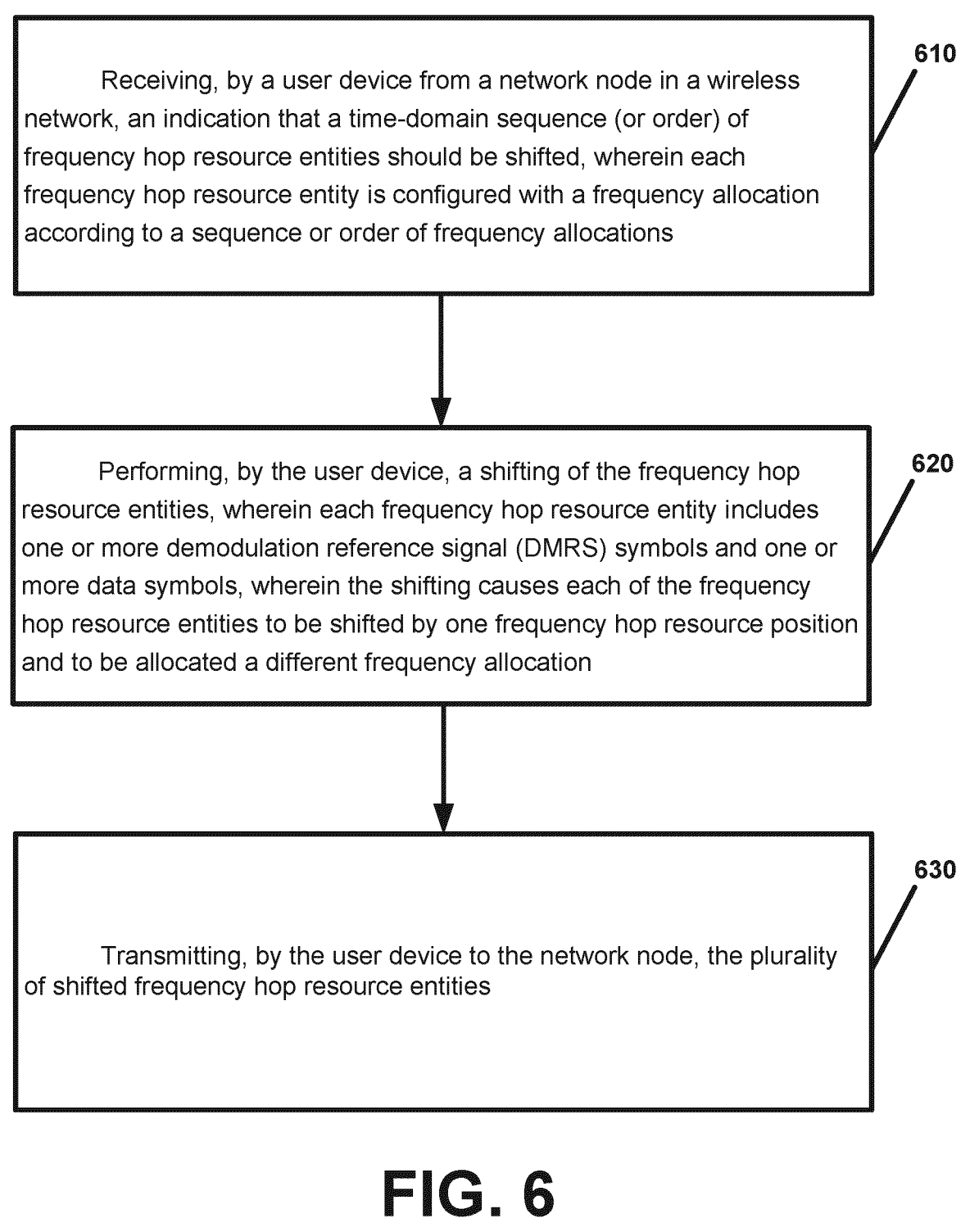

Receiving, by a user device from a network node in a wireless network, an indication that a time-domain sequence (or order) of frequency hop resource entities should be shifted, wherein each frequency hop resource entity is configured with a frequency allocation according to a sequence or order of frequency allocations

610

Performing, by the user device, a shifting of the frequency hop resource entities, wherein each frequency hop resource entity includes one or more demodulation reference signal (DMRS) symbols and one or more data symbols, wherein the shifting causes each of the frequency hop resource entities to be shifted by one frequency hop resource position and to be allocated a different frequency allocation

620

Transmitting, by the user device to the network node, the plurality of shifted frequency hop resource entities

Figure 7:
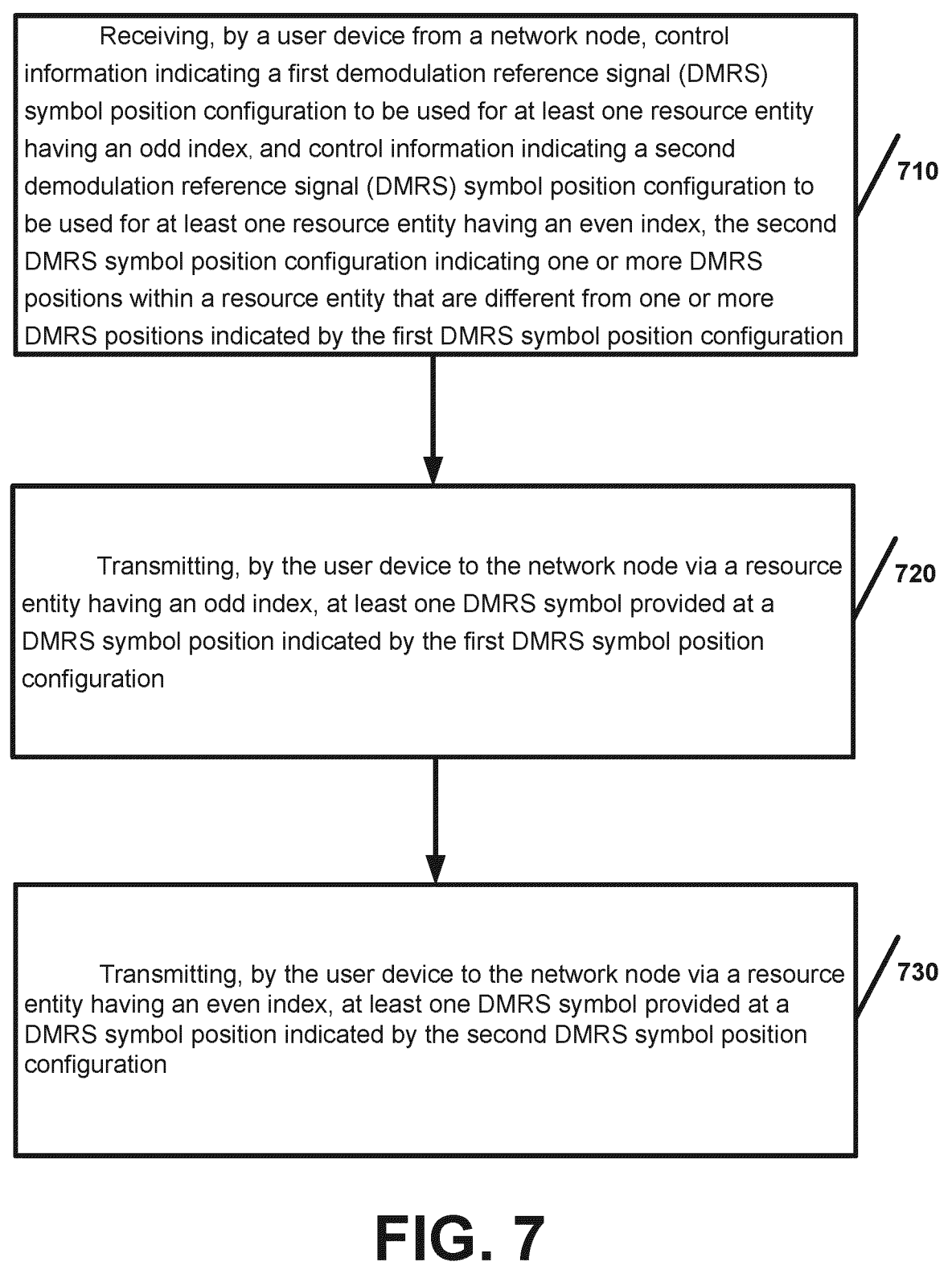

Receiving, by a user device from a network node, control information indicating a first demodulation reference signal (DMRS) symbol position configuration to be used for at least one resource entity having an odd index, and control information indicating a second demodulation reference signal (DMRS) symbol position configuration to be used for at least one resource entity having an even index, the second DMRS symbol position configuration indicating one or more DMRS positions within a resource entity that are different from one or more DMRS positions indicated by the first DMRS symbol position configuration

710

Transmitting, by the user device to the network node via a resource entity having an odd index, at least one DMRS symbol provided at a DMRS symbol position indicated by the first DMRS symbol position configuration

720

Transmitting, by the user device to the network node via a resource entity having an even index, at least one DMRS symbol provided at a DMRS symbol position indicated by the second DMRS symbol position configuration

DEMODULATION REFERENCE SIGNAL ALLOCATION FOR UPLINK SHARED CHANNEL FOR WIRELESS COMMUNICATION

CROSS REFERENCE TO RELATED APPLICATION

This patent application is a U.S. National Stage application of International Patent Application Number PCT/EP2021/071160 filed Jul. 28, 2021, which claims priority to U.S. Provisional Application No. 62/706,418 filed Aug. 14, 2020, which are hereby incorporated by reference in their entireties.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include: receiving, by a user device from a network node, control information that indicates a configured sequence (or order) of frequency allocations for a plurality of frequency hop resource entities, wherein the frequency allocations are provided at different frequency resources for each of the plurality of frequency hop resource entities; receiving, by the user device, an indication that the sequence (or order) of the frequency allocations for the frequency hop resource entities should be shifted; performing, by the user device, the shifting of the sequence of frequency allocations for the frequency hop resource entities, wherein each frequency hop resource entity includes one or more demodulation reference signal (DMRS) symbols and one or more data symbols; and transmitting, by the user device to the network node, the plurality of frequency hop resource entities via the shifted sequence of frequency allocations.

According to an example embodiment, a method may include: receiving, by a user device from a network node in a wireless network, an indication that frequency hop resource entities (e.g., a time-domain sequence (or order) of frequency hop resource entities) should be shifted, wherein each frequency hop resource entity is configured with a frequency allocation according to a sequence or order of frequency allocations; performing, by the user device, a shifting of the frequency hop resource entities, wherein each frequency hop resource entity includes one or more demodulation reference signal (DMRS) symbols and one or more data symbols, wherein the shifting causes each of the frequency hop resource entities to be shifted by one frequency hop resource position and to be allocated a different frequency allocation; and transmitting, by the user device to the network node, the plurality of shifted frequency hop resource entities.

According to an example embodiment, a method may include: receiving, by a user device from a network node, control information indicating a first demodulation reference signal (DMRS) symbol position configuration to be used for at least one resource entity having an odd index, and control information indicating a second demodulation reference signal (DMRS) symbol position configuration to be used for at least one resource entity having an even index, the second DMRS symbol position configuration indicating one or more DMRS positions within a resource entity that are different from one or more DMRS positions indicated by the first DMRS symbol position configuration; transmitting, by the user device to the network node via a resource entity having an odd index, at least one DMRS symbol provided at a DMRS symbol position indicated by the first DMRS symbol position configuration; and transmitting, by the user device to the network node via a resource entity having an even index, at least one DMRS symbol provided at a DMRS symbol position indicated by the second DMRS symbol position configuration.

According to an example embodiment, a method may include: receiving, by a user device from a network node in a wireless network, information identifying an offset amount to be used to adjust a position of at least one demodulation reference signal (DMRS) symbol within a resource entity; determining, by the user device, an adjusted (or shifted) DMRS symbol position for at least one DMRS symbol within the uplink resource entity by shifting a previous or configured DMRS symbol position of the at least one DMRS symbol by the offset amount of symbols within the resource entity; and transmitting, by the user device to the network node, the resource entity including the at least one DMRS symbol provided at the adjusted position within the resource entity.

According to an example embodiment, a method may include: determining, by the user device, a number of symbols for each of a plurality of frequency hop segments for intra-slot frequency hopping, including: determining a first number of symbols for a first frequency hop segment by dividing a number of symbols of the slot by a number of frequency hop segments, and rounding down to a closest integer; allocating the first number of symbols to the first frequency hop segment; performing the following for each of the remaining frequency hop segments, except that last segment of the slot: determining an updated number of symbols by decreasing the number of symbols of the slot by a previously allocated number, and determining an updated number of frequency hop segments by decreasing the number of frequency hop segments by 1; determining a number of symbols for a next frequency hop segment by dividing the updated number of symbols of the slot by the update number of frequency hop segments, and rounding down to a closest integer; and allocating one or more remaining symbols to a last frequency hop segment of the slot.

According to an example embodiment, a method may include: determining, by the user device, a number of symbols for each of a plurality of frequency hop segments for intra-slot frequency hopping, including: determining a first number of symbols for a first frequency hop segment by dividing a number of symbols of the slot by a number of frequency hop segments, and rounding down to a closest integer; allocating the first number of symbols to the first frequency hop segment; and allocating a remaining, unallocated, number of symbols of the slot evenly or uniformly among a remaining frequency hop segments.

According to an example embodiment, a method may include: determining, by the user device, a number of symbols for each of a plurality of frequency hop segments of a slot for intra-slot frequency hopping, including: determining a number of symbols for each of the frequency hop segments, except a last frequency hop segment of the slot, by dividing a number of symbols of the slot by a number of frequency hop segments, and rounding down to a closest integer; and allocating a remaining number of symbols to the last frequency hop segment of the slot.

According to an example embodiment, a method may include: determining, by the user device, a resource block offset that indicates a resource offset in frequency domain between a starting position of frequency resources allocated to a first frequency hop resource entity and a starting position of frequency resources allocated to a last frequency hop resource entity, wherein a starting position of frequency resources allocated to of one or more remaining frequency hop resource entities are distributed evenly between the starting position of the frequency resources allocated to the first frequency hop resource entity and the starting position of the last frequency hop resource entity; and determining, by the user device, frequency resources allocated to each of a plurality of frequency hop resource entities of a slot, based on the resource offset.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

BRIEF DESCRIPTION OF THE DRAWINGS

FIG. 6 is a flow chart illustrating operation of a user device according to another example embodiment.

FIG. 7 is a flow chart illustrating operation of a user device according to another example embodiment.

DETAILED DESCRIPTION

Figure 1:
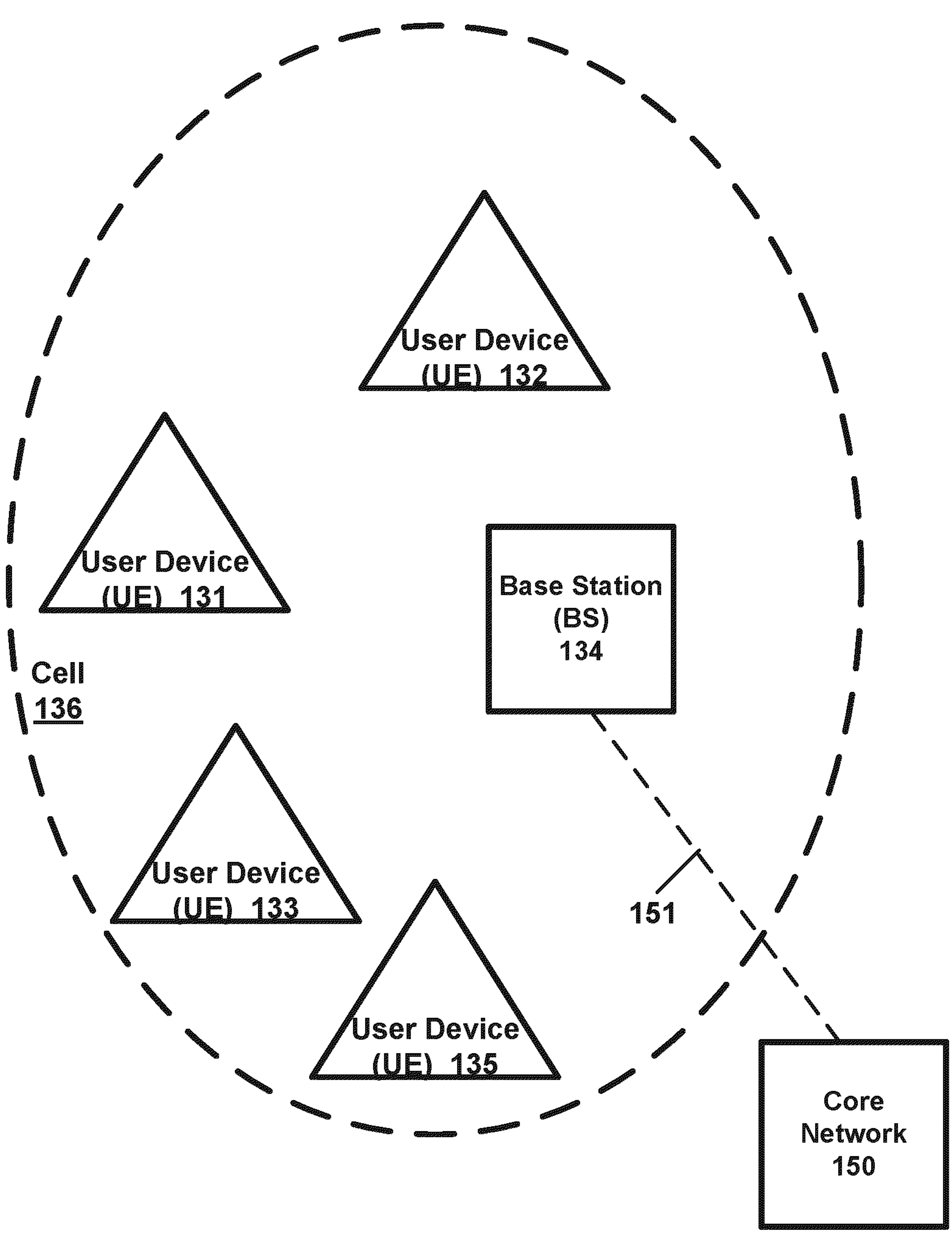
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a 51 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Frequency hopping may include the use of different frequencies (or different frequency resources, such as different subcarriers) for the transmission of data in order to provide frequency diversity. In some cases, a UE may use frequency hopping to transmit uplink data (e.g., via a physical uplink shared channel (PUSCH)) to increase frequency diversity for uplink data transmission. For example, data may be transmitted via different frequency hop resource entities (different sets of frequency resources, which may be used for frequency hopping). For example, frequency hop resource entities may include one or more slots (e.g., including PUSCH symbols of a slot) (for inter-slot frequency hopping), or one or more frequency hop segments within a slot (for intra-slot frequency hopping).

For example, a UE may perform frequency hopping as inter-slot frequency hopping or intra-slot frequency hopping. For inter-slot frequency hopping, different (e.g., uplink data transmission) frequency resources may be used for each slot of two or more consecutive slots. For example, data may be transmitted in a first slot via a first set of frequency resources (e.g., a first set of subcarriers), while data may be transmitted in a second (a next consecutive) slot via a second set of frequency resources that are different than the first set of frequency resources, e.g., in order to provide frequency diversity for the data transmission. In an example of intra-slot frequency hopping, a slot may be divided into multiple frequency hop segments, where each frequency hop segment within the slot may include a subset of the symbols of the slot. For example, a 14 symbol slot may be divided into two 7-symbol frequency hop segments, or may be divided into three frequency hop segments (e.g., having 4, 5 and 5 symbols for the three frequency hop segments). Different frequency resources (e.g., a different set of subcarriers) may be used for each frequency hop segment.

Demodulation reference signals (DMRS) may be transmitted by a user device or user equipment (UE) to a gNB (e.g., or BS or other network node) to assist the gNB in data demodulation. A slot may include between 7 and 14 symbols (e.g., orthogonal frequency division multiplexing (OFDM) symbols, or other symbols). In an example embodiment, a slot may include 12 or 14 consecutive symbols, depending on the cyclic prefix for the slot. A UE may receive downlink control information (DCI) in a physical downlink control channel (PDCCH) of a slot. The DCI may, for example, indicate a scheduled uplink grant (of time-frequency resources) on a physical uplink shared channel (PUSCH) for the UE to transmit data to the gNB. The PUSCH (uplink shared channel within a slot) may include 2-14 symbols of the up to 14 symbols of the slot. Some of the PUSCH symbols may be data symbols that are used for data transmission, and other symbols of the PUSCH may be DMRS symbols for the transmission of a DMRS. Thus, for example, data symbols and DMRS symbols may be time division multiplexed on the PUSCH of a slot. For example, there may be 1-4 DMRS symbols (or 1-4 DMRS instances) within the slot. Each slot may include an index number, e.g., indexes 0, 1, 2, 3, 4, 5, . . . Thus, the slot indexes 0, 2, 4, 6, . . . are even slot indexes, while indexes 1, 3, 5, . . . are odd indexes. In PUSCH mapping type A, a first DMRS of the slot may be located at symbol index 2 or 3 (e.g., where the first symbol of the slot may have index of 0).

By way of illustrative example, one or more problems or challenges may occur for the transmission of DMRS symbols.

Problem 1: DMRS imbalance among frequency hop segments. In some cases, the number of frequency hops (frequency hop (FH) segments) (e.g., such as for intra-slot frequency hopping) may be 2, 3 or more frequency hop segments per slot. In some cases, a DMRS imbalance may occur if the number of DMRS symbols per slot is not an integer multiple of the number of frequency hop segments. A DMRS imbalance may refer to an unequal number of DMRS symbols in each of the multiple frequency hop segments of a slot. For example, if there are 5 DMRS symbols provided for a slot of 14 symbols that includes 3 frequency hop segments (of 4 symbols, 5 symbols and 5 symbols), a DMRS imbalance will occur among the 3 frequency hop segments. For example, the first frequency hop (FH) segment of 4 symbols may include 1 DMRS symbol; the second FH segment of 5 symbols may include 2 DMRS symbols; and the third FH segment of 5 symbols may include 2 DMRS symbols, which is an uneven or imbalance number of DMRS symbols in the multiple FH segments of the slot. Also, in some cases, the number of DMRS symbols allocated for each FH hop segment of a slot may be fixed or static over a period of time. This may lead to deterministic channel estimation accuracy differences across the different frequency hops of the slot at the receiving gNB. In such case, a frequency hop (or FH segment, such as the FH segment with only 1 DMRS symbol) may be penalized and suffer when rapid channel fluctuations occur, or when noise or interference is stronger. Thus, in some cases, such as the imbalanced DMRS situation among multiple FH segments, repeating the same number of DMRS symbols for the multiple segments is imbalanced and may penalize or disadvantage demodulation of a FH segment that has fewer DMRS symbols than other FH segments of the slot.

Problem 2: Limitations of fixed or static DMRS symbol positions in frequency hop (FH) segments, or per slot. Fixed or static position DMRS symbols within FH segments or within a slot is very inflexible and may prevent change or adaptation of DMRS symbols for FH segments or slots, depending on the particular conditions.

Problem 3: The need or desirability to support intra-slot frequency hopping with 3 or more frequency hop (FH) segments per slot. Challenges may include, e.g.: determining a time duration or number of symbols of each FH or each FH segment of a slot such as for intra-slot hopping; and/or how to determine the frequency locations or how to determine an allocation of frequency resources (e.g., subcarriers or frequencies) for slots or FH segments (for intra-slot hopping and/or for inter-slot hopping).

As described herein, embodiments 1 and 2 may at least partially address (e.g., address and/or improve in part) problem 1; embodiment 3 may at least partially address problem 2; and embodiments 4 and 5 may at least partially address problem 3.

Embodiment 1: A shift (e.g., circular shift) may be applied to frequency hop resource entities. Thus, for example, a circular shift may be applied to slots for inter-slot frequency hopping. Or, a circular shift may be applied to frequency hop segments for intra-slot frequency hopping.

For example, according to an example of embodiment 1, a method may include: receiving, by a user device (UE) from a network node (e.g., gNB or BS), control information that indicates a configured sequence (or order) of frequency allocations for a plurality of frequency hop resource entities, wherein the frequency allocations are provided at different frequency resources for each of the plurality of frequency hop resource entities; receiving, by the user device, an indication that the sequence (or order) of the frequency allocations for the frequency hop resource entities should be shifted; performing, by the user device, the shifting of the sequence of frequency allocations for the frequency hop resource entities, wherein each frequency hop resource entity includes one or more demodulation reference signal (DMRS) symbols and one or more data symbols; and transmitting, by the user device to the network node, the plurality of frequency hop resource entities via the shifted sequence of frequency allocations. As noted, the uplink resource entity may include at least one of: a slot that includes a plurality of symbols, wherein at least two consecutive slots are allocated different frequency resources (e.g., for inter-slot frequency hopping); or a frequency hop segment (e.g., for intra- slot frequency hopping), wherein a slot comprises a plurality of frequency hop segments, wherein each frequency hop segment within the slot includes a subset of the symbols of the slot, and wherein frequency hop segments within the slot are allocated different frequency resources. Thus, in the case of intra-slot FH, the performing shifting may include circular shifting the sequence or order of frequency allocations for the plurality of consecutive frequency hop segments within the slot.

Another example of embodiment 1 may include performing a shifting (e.g., a circular shifting) of the frequency hop resource entities, wherein the shifting causes each of the frequency hop resource entities to be shifted by one frequency hop resource position and to be allocated a different frequency allocation. Thus, according to this different example of embodiment 1, a method may include receiving, by a user device (UE) from a network node (e.g., gNB) in a wireless network, an indication that a time-domain sequence (or order) of frequency hop resource entities should be shifted, wherein each frequency hop resource entity is configured with a frequency allocation according to a sequence or order of frequency allocations; performing, by the user device, a shifting of the frequency hop resource entities, wherein each frequency hop resource entity includes one or more demodulation reference signal (DMRS) symbols and one or more data symbols, wherein the shifting causes each of the frequency hop resource entities to be shifted by one frequency hop resource entity position and to be allocated a different frequency allocation. Thus, performing a shifting of the frequency hop resource entities causes each frequency resource entity to be allocated different frequency resources as compared to before the shifting, and the shifting also causes a change in a time order of the frequency resource entities. The method may also include transmitting, by the user device to the network node, the plurality of shifted frequency hop resource entities.

Thus, with respect to this example of embodiment 1, for example, in the case of intra-slot frequency hopping, the uplink resource entity may include a frequency hop segment, wherein a slot comprises a plurality of frequency hop segments, wherein each frequency hop segment within the slot includes a subset of the symbols of the slot, and wherein the frequency hop segments within the slot are allocated different frequency resources, wherein the performing shifting may include: performing a circular shifting of the plurality of frequency hop segments, wherein each frequency hop segment includes one or more demodulation reference signal (DMRS) symbols and one or more data symbols, wherein the circular shifting causes each of the plurality of frequency hop segments to be shifted by one frequency hop segment position within the slot and to be allocated a different frequency allocation for intra-slot frequency hopping. Thus, the performing a shifting may include performing a circular shifting of the frequency hop segments within the slot to cause each frequency hop segment within the slot to be allocated different frequency resources as compared to before the shifting, and the shifting also causes a change in a time order of the frequency hop segments within the slot. Also, the UE may receive an indication of a subset of FH segments of a slot (e.g., only for FH segments 1 and 2, and not FH segment 3 within a slot) on which the circular shifting may be applied.

Thus, for example, embodiment 1 may include: For intra-slot frequency hopping with PUSCH repetition type A, a circular shift may be applied to PUSCH segments (frequency hop (FH) segments) within a slot, e.g., among the consecutive slots.

Also, the gNB can configure to apply the circular shift on only a subset of the PUSCH segments (e.g., FH segments within a slot). The configuration can be done in RRC or the set of active PUSCH segments for shifting can be indicated via a bitmap in DCI. Alternatively, in case code block segmentation is used, each code block can be mapped to and circularly shifted together with each PUSCH (FH) segment. In this case, each code block can experience frequency diversity. In case code block segmentation is not used, the transport block bits can be grouped, mapped and circularly shifted together with each PUSCH segment to exploit frequency diversity.

Embodiment 2: The UE may receive control information indicating different DMRS symbol position configurations for resource entities (e.g., slots or FH segments) having odd indexes (e.g., FH segment or slot indexes of 1, 3, 5, . . . ) and even indexes (e.g., FH segment or slot indexes of 0, 2, 4 . . . ). In this manner, different DMRS symbol positions within a slot or FH segment may be provided or indicated for every other (e.g., odd or even index) slot or FH segment. This may allow DMRS balance to be improved. Thus, according to embodiment 2, a method may include receiving, by a user device (UE) from a network node (e.g., gNB), control information indicating a first demodulation reference signal (DMRS) symbol position configuration to be used for at least one resource entity (e.g., slot or FH segment) having an odd index, and control information indicating a second demodulation reference signal (DMRS) symbol position configuration to be used for at least one resource entity having an even index, the second DMRS symbol position configuration indicating one or more DMRS positions within a resource entity that are different from one or more DMRS positions indicated by the first DMRS symbol position configuration; and transmitting, by the user device to the network node via a resource entity having an odd index, at least one DMRS symbol provided at a DMRS symbol position indicated by the first DMRS symbol position configuration; and transmitting, by the user device to the network node via a resource entity having an even index, at least one DMRS symbol provided at a DMRS symbol position indicated by the second DMRS symbol position configuration. The resource entity may include either a slot that may have an odd or even index, or a FH segment that may have an odd or even index. Thus, for example, in the case of intra-slot frequency hopping, the control information received by the UE from the network node or gNB may indicate a first demodulation reference signal (DMRS) symbol position configuration to be used for at least one frequency hop segment, within a slot, having an odd index, and a second demodulation reference signal (DMRS) symbol position configuration to be used for at least one frequency hop, segment within the slot, having an even index (where the two DMRS symbol position configurations may indicate different symbol positions within an FH segment (e.g., as between odd and even indexed FH segments).

In an example embodiment of embodiment 2, the DMRS symbol position configurations may be provided or indicated as two different tables (allocation tables) that indicate one or more different DMRS symbol positions. For example, this may include configuring the UE with two different DMRS allocation tables similar to Table 6.4.1.1.3-6 in 3GPP TS 38.214. Each table corresponds to DMRS allocation in odd or even slot number in the PUSCH repetition type A. The gNB can configure which table is used for even/odd slot number or dynamically switch between the two tables. Also, for example, the embodiment 1 and embodiment 2 may be used together, e.g., to allow a UE to both: 1) shift (e.g., circular shift) frequency hop resource entities (e.g., slots or FH segments), and 2) use specific DMRS symbol positions that are different for odd and even indexed resource entities (e.g., slots or segments).

Embodiment 3: A UE may perform a shift (e.g., circular shift) DMRS signal position within a resource entity (e.g., slot or FH segment) based on an offset amount (e.g., indicating a number of symbols the DMRS symbol position should be circularly shifted). For example, an adjusted or shifted DMRS symbol position (e.g., within a slot or within a FH segment) may be obtained by shifting a previous or configured DMRS symbol position of at least one DMRS symbol by the offset amount of symbols within the resource entity (e.g., within the slot or within the FH segment). Thus, an example of embodiment 3 may include, receiving, by a user device (UE) from a network node (e.g., gNB) in a wireless network, an offset amount to be used to adjust a position of at least one demodulation reference signal (DMRS) symbol within a resource entity; determining, by the user device, an adjusted (or shifted) DMRS signal position for at least one DMRS symbol within the uplink resource entity by shifting a previous or configured DMRS symbol position of the at least one DMRS symbol by the offset amount of symbols within the resource entity; and transmitting, by the user device to the network node, the resource entity including the at least one DMRS symbol provided at the adjusted position within the resource entity. As noted, the resource entity may be a slot or a FH segment within a slot.

A circular shift of the DMRS symbol positions within the slot may be signaled or request by the gNB sending a field in DCI to indicate the shifting offset (or offset amount) $D_{offset}$. The new position Pnew for each DMRS symbol will be deduced from the old position $$p_{old} \text{ by } p_{new}=(p_{old}+D_{offset}) \bmod 14.$$

In case of frequency hopping, the cyclic shift (or circular shift) can be applied per hop (or within each FH segment), e.g., $p_{new}=(p_{old}+D_{offset}) \bmod l_d$, where $l_d$ is PUSCH duration for one frequency hop (one FH segment). In this case, the number of bits in DCI to indicate $D_{offset}$ can be further reduced. Alternatively, the gNB can use a bitmap of M bits in DCI, where M is the number of frequency hops, to indicate which frequency hop(s) the cyclic (circular) shift should be applied.

Embodiment 4: Determination of a number of physical uplink shared channel (PUSCH) symbols including one or more DMRS symbols (or time duration) allocated per frequency hop segment for intra-slot frequency hopping. For example, a UE may determine a number of PUSCH symbols by rounding down of: dividing the total number of PUSCH symbols (all PUSCH symbols, including data symbols and DMRS symbols) per slot by the number of FH segments to obtain a number of PUSCH symbols for a first FH segment. Then, for example, the remaining PUSCH symbols may be divided evenly or uniformly among the remaining FH segments of the slot.

For instance, the number of symbols (or time duration) for the $i^{th}$ frequency hop may be determined by $$\begin{cases} T_i=\lfloor N_{BWP}^{PUSCH,s}/M \rfloor,\ i=0,1,2,\ldots,M-1 \\ T_M=N_{BWP}^{PUSCH,s}-M\lfloor N_{BWP}^{PUSCH,s}/M \rfloor. \end{cases}$$

With this approach, a 14 symbols PUSCH with 3 hops and 4 hops would be split in a 4-4-6 symbols (for the 3 FH segments) and 3-3-3-5 (for 4 FH segments) symbols pattern, respectively. For example, if there are 3 FH segments (3 hops) within a slot, and 14 symbols, the above equation may be used as follows: in the equation above, N is total number of PUSCH symbols in the slot, and M is number of FH segments in the slot: N/M indicates (14 symbols divided by 3 (and rounded down) equals 4 symbols for first FH segment of slot. Also, all FH segments will be given that size (that number of symbols), except the last FH segment, per the above equation. The remaining symbols would then be allocated to the last FH segment, per the above equation. Thus, for example: 4 symbols for first FH segment; 4 symbols for second FH segment, and 5 (remaining number of symbols) for the third FH segment, in case of three FH segments and 14 total symbols for slot.

For example, instead of using the above equation, the UE may use the following pseudocode to determine a duration of number of symbols or duration of each FH segment.

The pseudocode would first calculate TM−m (T0), for first segment would be 14/3, and rounded down would be 4 symbols for first FH segment. Next, m=3−1=2. N=14−T1=10.

```
m = M (total no. of FH segments
N = N_BWP^{PUSCH,s} (no. of symbols in a slot, e.g., 14)
While m ≥ 2 (in a case where there is more than 2 FH segments)
  T_{M-m} = ⌊N/m⌋
  N = N − T_{M-m}
  m = m − 1
End
T_{M-1} = N_BWP^{PUSCH,s} − Σ_{i=0}^{M-2} T_i
```

TM−m (T1) for second segment would be N/m=10/2, where 10 is the remaining no. of symbols, and 2 is remaining number of FH segments, and rounded down would be 5 symbols for second FH segment. Next, m=3−2=1, the remaining symbols would then be allocated to the last FH segment.

Embodiment 5: This embodiment may describe ways or techniques to determine a frequency or frequency resources (or frequency location) of each FH segment within a slot for intra-slot frequency hopping, or of each slot for inter-slot frequency hopping. For example, this embodiment may include the gNB indicating to the UE one or more frequency offsets, and/or one or more starting position in the frequency domain of at least one FH segment, from which the UE may determine the frequencies and/or subcarriers (frequency resources) for each FH segment. For example, the gNB may indicate or signal to the UE an RBoffset that indicates an offset (or number of resource blocks/RBs) between a starting position in frequency domain of the first FH segment, and the starting position in frequency domain of a last FH segment within a slot. The remaining FH segments (between first and last FH segments) may be uniformly distributed between the starting positions (starting frequencies/subcarriers) of first and last FH segments. Or, a RBoffset and a starting position in frequency domain of a first FH segment may be provided or signaled by gNB to UE, where the UE may be able to determine the frequencies or frequency resources of each FH segment based on this information, for example. Thus, different approaches may be used, including 1) a multi-offset approach where gNB may signal to UE multiple frequency domain offsets (or frequency domain starting points) for the FH segments, or for all FH segments, or 2) a single offset approach, e.g., where a RBoffset is provided or signaled by gNB, and uniform or even spacing in frequency domain is provided between starting frequency resources of each of the FH segments of the slot. The gNB may provide a flag or bit to indicate either a single offset or multi-offset approach will be used to indicate a duration or location of frequency resources for each FH segment.

The following frequency offset determination procedure may be used, for example, for intra-slot frequency hopping with more than 2 hops: Use one frequencyHopping OffsetLists parameter (similar to 3GPP Rel-16 PUSCH frequency hopping feature) to indicate the offset between the starting RB (resource block) of the first hop (first FH segment) and the last hop (last FH segment) of the cell. The remaining frequency hops may be uniformly distributed between the first and last hops using the following formula, for example:

$$\begin{cases} RB_{start}^{0} = RB_{start}, \\ RB_{start}^{N} = \left(RB_{start}^{0} + RB_{offset}\right) \bmod N_{BWP}^{size}, \\ RB_{start}^{i} = \left(RB_{start}^{i-1} + \left\lfloor \frac{RB_{offset}}{N-1} \right\rfloor\right) \bmod N_{BWP}^{size},\ i = 1, 2, \ldots M, \end{cases}$$

where M is the total number of frequency hops that can be dynamically indicated through the scheduling DCI (e.g. by extending the "frequency hopping flag" field in the DCI from 1 bit to $\lceil \log_2 M \rceil$ bits) and $RB_{start}$ is the starting RB within the UL BWP (uplink bandwidth part).

Also, a new RRC (radio resource control) parameter may be used by the gNB to configure (signal to UE) whether Single-offset or Multi-offset approach is used. Alternatively, a new DCI field, namely "Multi-offset flag", such that the gNB can dynamically switch between the Single-offset and Multi-offset approaches.

Both Multi-offset and Single-offset approaches can be standardized and the gNB can configure/indicate which approach to be used. For example, the Single-offset approach can be considered as default behavior. A Multi-offset approach could thus be used by gNB for some channel conditions to capitalize on a larger frequency hopping configuration flexibility. To make this switching feasible, a new RRC parameter may be provided by the gNB may use to configure whether Single-offset or Muti-offset approach is used. Also, or alternatively, a new DCI field, namely "Multi-offset flag", such that the gNB can dynamically switch the UE between the Single-offset and Multi-offset approaches.

Thus, different approaches may be used for embodiment 4, including one or more of the following:

1) A method including: determining, by the user device, a number of symbols for each of a plurality of frequency hop segments for intra-slot frequency hopping, including: determining a first number of symbols for a first frequency hop segment by dividing a number of symbols of the slot by a number of frequency hop segments, and rounding down to a closest integer; allocating the first number of symbols to the first frequency hop segment; performing the following for each of the remaining frequency hop segments, except that last segment of the slot: determining an updated number of symbols by decreasing the number of symbols of the slot by a previously allocated number, and determining an updated number of frequency hop segments by decreasing the number of frequency hop segments by 1; determining a number of symbols for a next frequency hop segment by dividing the updated number of symbols of the slot by the update number of frequency hop segments, and rounding down to a closest integer; and allocating one or more remaining symbols to a last frequency hop segment of the slot.

2) A method including: determining, by the user device, a number of symbols for each of a plurality of frequency hop segments for intra-slot frequency hopping, including: determining a first number of symbols for a first frequency hop segment by dividing a number of symbols of the slot by a number of frequency hop segments, and rounding down to a closest integer; allocating the first number of symbols to the first frequency hop segment; and allocating a remaining, unallocated, number of symbols of the slot evenly or uniformly among a remaining frequency hop segments.

3) A method including: determining, by the user device, a number of symbols for each of a plurality of frequency hop segments of a slot for intra-slot frequency hopping, including: determining a number of symbols for each of the frequency hop segments, except a last frequency hop segment of the slot, by dividing a number of symbols of the slot by a number of frequency hop segments, and rounding down to a closest integer; and allocating a remaining number of symbols to the last frequency hop segment of the slot.

Further explanations and illustrative details are provided below for the embodiments 1-3.

Embodiment 1: A shift (e.g., circular shift) may be applied to frequency hop resource entities. Thus, for example, a circular shift may be applied to slots for inter-slot frequency hopping. Or, a circular shift may be applied to frequency hop (FH) segments for intra-slot frequency hopping. By shifting frequency hop resource entities (such as FH segments), a more balanced DMRS allocation may be achieved among the multiple frequency hop resource entities (e.g., among the multiple FH segments of a slot).

Figure 2A:
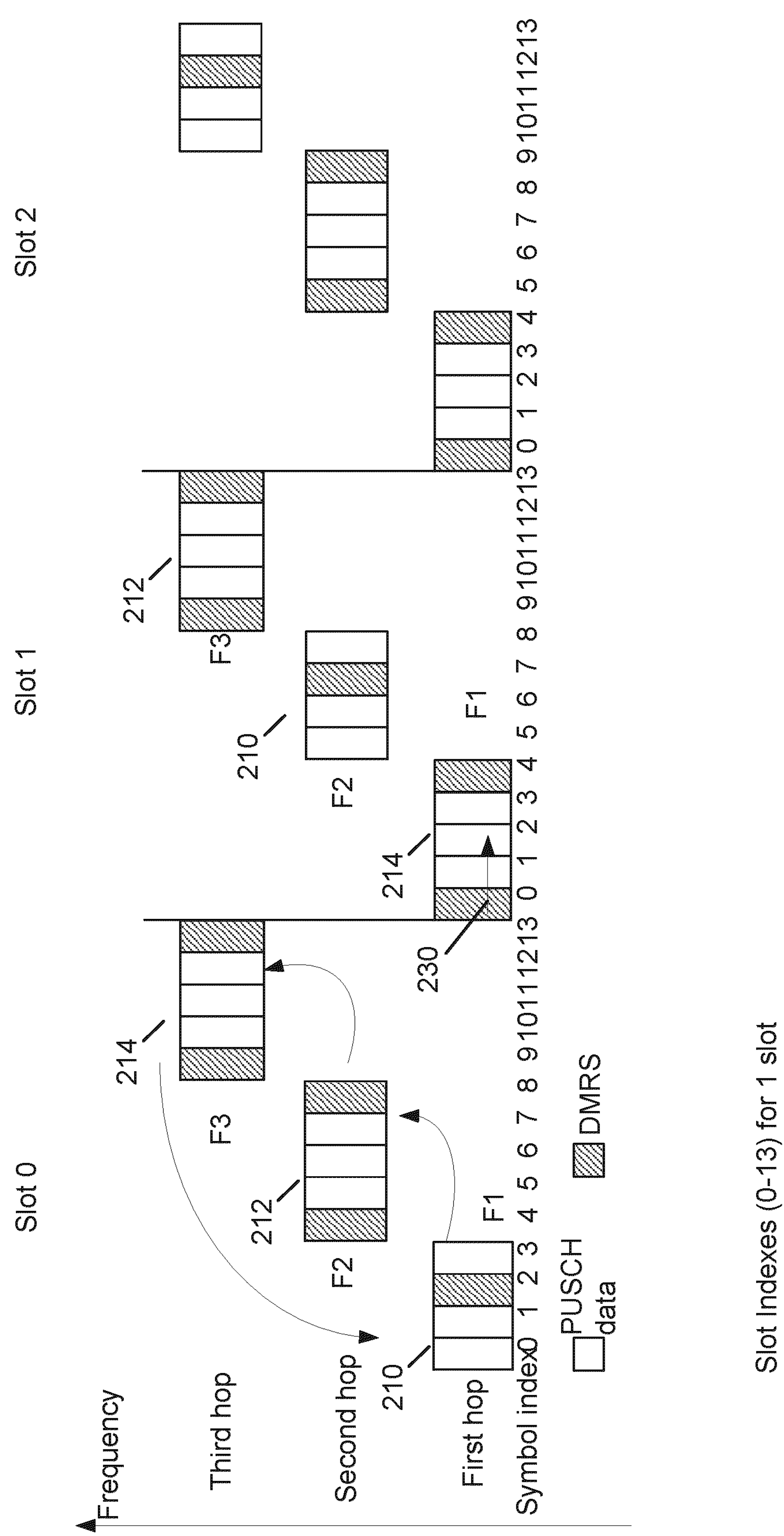
FIG. 2A is a diagram illustrating a shifting by a user device (or UE) of frequency hop resource entities according to an example embodiment.

FIG. 2A is a diagram illustrating a shifting by a user device (or UE) of frequency hop resource entities according to an example embodiment. FIG. 2A may illustrated an example DMRS allocation for intra-slot frequency hopping with PUSCH mapping type A, l_d=4,5 and 5 for 1st, 2nd and 3rd hops, respectively, l_0=2, PUSCH repetition type A with number of repetitions K=3. As shown in FIG. 2A, three example slots are shown including slot 0, slot 1, and slot 2. Horizontal axis shows indexes for symbols of each slot, while vertical (or Y) axis shows frequency or frequency resources. In this illustrative example, each slot includes three frequency hop (FH) segments, including FH segment 210, FH segment 212, and FH segment 214. In slot 0, no circular shifting has been performed, and frequency resources F1 are allocated for FH segment 210; frequency resources F2 are allocated for FH segment 212, and frequency resources F3 are allocated for FH segment 214. The time-domain sequence of the FH segments for slot 0 (without circular shifting) is: FH segment 210, FH segment 212 and FH segment 214 (in this order or sequence).

Thus, for example, in the case of intra-slot frequency hopping, the uplink resource entity may include a frequency hop segment, wherein a slot comprises a plurality of frequency hop segments, wherein each frequency hop segment within the slot includes a subset of the symbols of the slot, and wherein the frequency hop segments within the slot are allocated different frequency resources. Thus, as shown in the example of FIG. 2A, slot 0 includes three FH segments (210, 212 and 214), where each of these FH segments includes a subset of the 14 symbols of slot 0. For example, with respect to slot 0 (where shifting has not been performed), FH segment 210 may include symbols 0-3; FH segment 212 may include symbols 4-8; and FH segment 214 may include symbols 9-13 (these indicate symbol indexes of symbols of slot 0). Each of the three FH segments of slot 0 are allocated different frequency resources: FH segment 210 is allocated frequency resources F1; FH segment 212 is allocated frequency resources F2; and FH segment 214 is allocated frequency resources F3 (at least initially as shown in slot 0, before any shifting has been performed by the UE).

The UE may perform shifting or circular shifting of the plurality (e.g., all three) frequency hop segments (e.g., 210, 212 and 214). The UE may, for example, perform circular shifting of the FH segments shown in slot 0 to obtain the FH segments shown in slot 1. For example, as shown by the arrows, the location (order and/or frequency resources) of each FH segment of slot 0 may be circularly shifted, to obtain the (circular shifted) FH segments of slot 1, for example. As shown in FIG. 2A, FH segment 210 may shift 1 FH segment location/position to the right (to the location of FH segment 212). FH segment 212 may shift 1 FH segment position/location to the right (to the location of FH segment 214). And, FH segment 214 may be shifted 1 FH segment location, within slot 0, to the location of FH segment 210, which results in the shifted FH segments shown in slot 1 of FIG. 2A. Also, the shifting of the FH segments may cause each shifted FH segment to have a different frequency allocation. For example (as shown in slot 1), FH segment 210 now is allocated frequency resources F2 after being shifted; FH segment 212 now is allocated frequency resources F3 after being shifted; and FH segment 214 is now allocated frequency resources F1 after being shifted. As a result, it can be seen that the circular shifting of FH segments within a slot causes each of the plurality of frequency hop segments to be shifted by one frequency hop segment position within the slot and to be allocated a different frequency allocation for intra-slot frequency hopping.

Thus, with respect to (or as shown) by the example shown in FIG. 2A of embodiment 1, a UE (or user device) may perform the following: receiving, by a user device from a network node in a wireless network, an indication that a time-domain sequence (or order) of frequency hop resource entities should be shifted, wherein each frequency hop resource entity is configured with a frequency allocation according to a sequence or order of frequency allocations; performing, by the user device, a shifting of the frequency hop resource entities, wherein each frequency hop resource entity includes one or more demodulation reference signal (DMRS) symbols and one or more data symbols, wherein the shifting causes each of the frequency hop resource entities to be shifted by one frequency hop resource position and to be allocated a different frequency allocation; and transmitting, by the user device to the network node, the plurality of shifted frequency hop resource entities. Also, for example, the performing a shifting of the frequency hop resource entities causes each frequency resource entity to be allocated different frequency resources as compared to before the shifting, and the shifting also causes a change in a time order of the frequency resource entities. A frequency hop (FH) resource entity may include a slot or a FH segment. In the case where the frequency hop resource entity includes a frequency hop (FH) segment, the performing a shifting of the frequency hop resource entities may include, e.g., performing a circular shifting of the frequency hop segments within the slot to cause each frequency hop segment within the slot to be allocated different frequency resources as compared to before the shifting, and the shifting also causes a change in a time order of the frequency hop segments within the slot. This is shown in the example of FIG. 2A.

Also, as shown in FIG. 2A, for a FH segment that has been shifted into a first FH segment position within a slot, the first DMRS symbol of that shifted first FH segment may be moved or shifted to a fixed position. For example, Mapping Type A or PUSCH Type A for DMRS may require that a first DMRS symbol for a slot be located in a symbol position (or symbol index) 2 or 3. Thus, for example, the UE may perform: selecting, by the user device after the shifting has been performed, a frequency hop resource entity that has been shifted into a first frequency hop segment position within the time-domain sequence (or order) of frequency hop segments within the slot; and moving, by the user device prior to the transmitting, a first DMRS signal (in time domain) of the selected frequency hop segment to a fixed symbol position within the selected frequency hop segment. As shown in slot 1 of FIG. 2A, the FH segment 214 is shifted into the first FH segment position of slot 1 (after being shifted). It can be seen that the first DMRS of FH segment 214 in slot 1 is symbol 0. Thus, in this example, as shown by arrow 230, the first symbol of this selected FH segment (or segment that has been shifted into a first FH segment position, e.g., FH segment 214) may be moved from symbol position 0 of FH segment 214 to symbol position 2, e.g., to comply with the requirements of the first DMRS position for Mapping Type A.

Figure 2B:
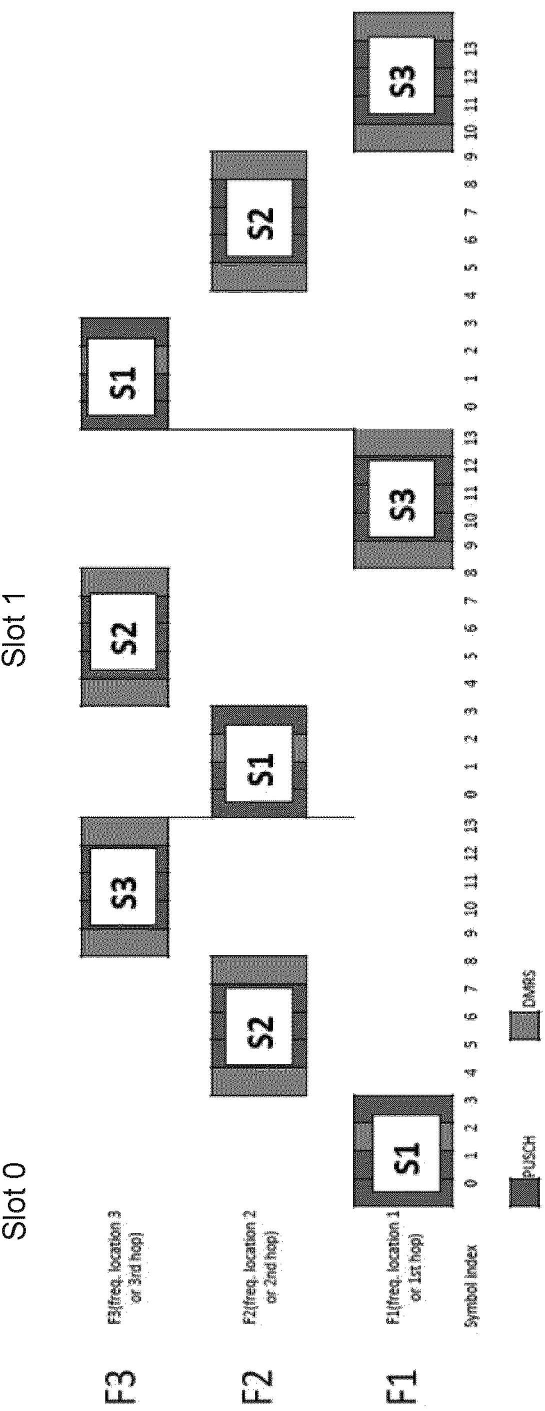
FIG. 2B is a diagram illustrating a shifting of a sequence of frequency allocations for frequency hop resource entities according to an example embodiment.

FIG. 2B is a diagram illustrating a shifting of a sequence of frequency allocations for frequency hop resource entities according to an example embodiment. In slot 0, prior to shifting, FH segment S1 is allocated frequency resources F1; FH segment S2 is allocated frequency resources F2; and FH segment S3 is allocated frequency resources F3. Also, the time order of the FH segments is S1, S2 and S3, for slot 0 (before shifting is performed). The UE may perform a shifting of the sequence of frequency allocations (of slot 0) for the segments to obtain the order, and frequency allocations of the FH segments shown in slot 1. Thus, as shown in FIG. 2B, after shifting of a sequence or order of frequency allocations for the FH segments, each FH segment (at slot 1) will have different frequency resources, and will be provided in a different or shifted FH segment location (or position). Thus, the shifting of a sequence of frequency allocations for FH segments, as shown in FIG. 2B, may cause FH segment S1 to move (or be circularly shifted) from a first (in time order) FH segment position (of slot 0) to a second FH segment position (for slot 1), and to be allocated frequency resources F2 (for slot 1) instead of frequency resources F1 (for slot 0). Also the shifting may cause the FH segment S2 to move from a second (in time order) FH segment position (of slot 0) to a third (or last) FH segment position (for slot 1), and to be allocated frequency resources F3 (for slot 1) instead of frequency resources F2 (for slot 0). Similarly, the shifting may cause the FH segment S3 to move or be circularly shifted from a third or last (in time order) FH segment position (of slot 0) to the first FH segment position (for slot 1), and to be allocated frequency resources FF13 (for slot 1) instead of frequency resources F3 (for slot 0).

As an example UE operation of the shifting shown in FIG. 2B, a UE may receive from a gNB control information that indicates a configured sequence (or order) of frequency allocations for a plurality of frequency hop resource entities (e.g., for a plurality of FH segments), wherein the frequency allocations are provided at different frequency resources for each of the plurality of frequency hop resource entities. Thus, as shown in FIG. 2B, the configured sequence or order (in time) of frequency allocations (see slot 0, before any circular shifting) is F1, F2, F3. The UE may also receive from the gNB an indication that the sequence (or order) of the frequency allocations for the frequency hop resource entities (e.g., FH segments) should be shifted. The UE may perform a circular shifting of the sequence of frequency allocations for the frequency hop resource entities.

Thus, as an example UE operation with respect to FIG. 2B, the UE may perform the following: receiving, by a user device (or UE) from a network node, control information that indicates a configured sequence (or order) of frequency allocations for a plurality of frequency hop resource entities, wherein the frequency allocations are provided at different frequency resources for each of the plurality of frequency hop resource entities; receiving, by the user device, an indication that the sequence (or order) of the frequency allocations for the frequency hop resource entities should be shifted; performing, by the user device, the shifting of the sequence of frequency allocations for the frequency hop resource entities , wherein each frequency hop resource entity includes one or more demodulation reference signal (DMRS) symbols and one or more data symbols; and transmitting, by the user device to the network node, the plurality of frequency hop resource entities via the shifted sequence of frequency allocations. Also, for example, a frequency allocation for each of the plurality of frequency hop resource entities may remain unchanged after performing the shifting. The frequency hop (FH) resource entities may include slots, or may include a plurality of FH segments within a slot. The for example, in a case where the frequency hop resource entity include a FH segment, the plurality of frequency hop resource entities may include a plurality frequency hop (FH) segments within a slot, wherein each frequency hop segment includes a plurality of symbols including one or more demodulation reference signal (DMRS) symbols and one or more data symbols, wherein intra-slot frequency hopping is performed by the user device for the transmission the plurality of frequency hop segments of the slot in which different frequency allocations are provided for each of the plurality of frequency hop segments; and, wherein the adjusting comprises circular shifting the sequence or order of frequency allocations for the plurality of consecutive frequency hop segments within the slot.

Figure 3:
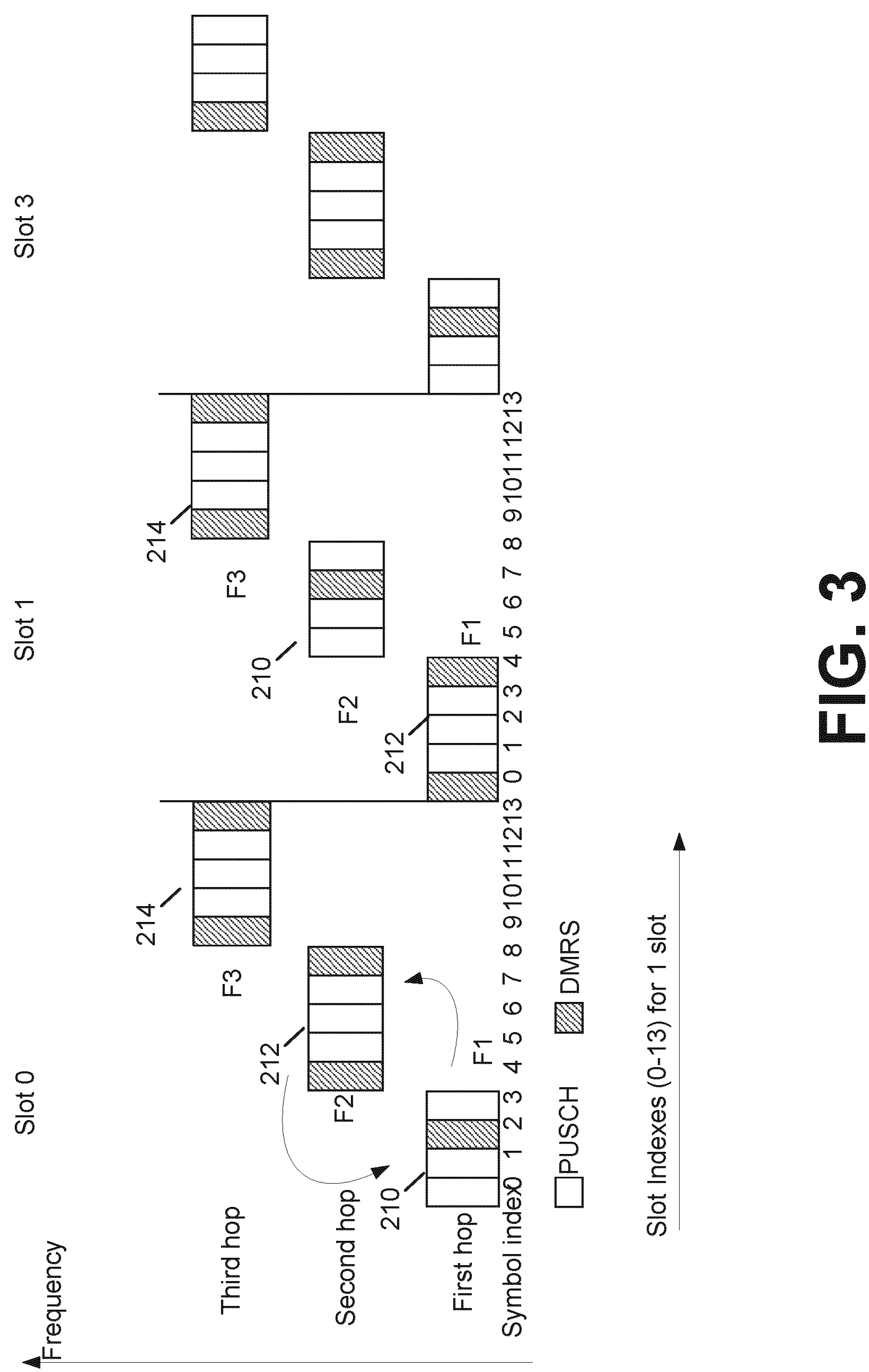
FIG. 3 is a diagram illustrating a shifting by a user device (or UE) of only a subset of frequency hop resource entities (e.g., a subset of FH segments within a slot) according to an example embodiment.

In some cases, the gNB may want to maintain an existing DMRS density (or number of DMRS symbols) of a FH segment within a slot, while possibly still performing circular switching on other FH segments in a slot (e.g., to improve DMRS balance for those other FH segments). In such a case, for example, the gNB may indicate or signal to the UE a subset of FH segments for which circular shifting should be performed (and no circular shifting will be performed for any other/remaining FH segments of the slot). FIG. 3 illustrates an example where only a subset of FH segments within a slot are shifted.

FIG. 3 is a diagram illustrating a shifting by a user device (or UE) of only a subset of frequency hop resource entities (e.g., a subset of FH segments within a slot) according to an example embodiment. As shown in FIG. 3, the UE may receive control information indicating that circular shifting of only FH segments 210 and 212 should be performed. Thus, as shown in slot 1 (after shifting) of FIG. 2A, FH segment 210 is shifted one position to the second FH segment position (that was previously occupied by FH segment 212), and the FH segment 212 is shifted 1 position in the other direction to the first FH segment position (that was previously occupied by FH segment 210). Thus, in this example, FH segments 210 and 212 switch positions, from slot 0 to slot 1. Whereas, slot 214, which is not part of the subset requested for circular switching, is not switched positions from slot 0 to slot 1.

Embodiment 2: The UE may receive(from the gNB) control information indicating different DMRS symbol position configurations for resource entities (e.g., slots or FH segments) have odd indexes (e.g., FH segment or slot indexes of 1, 3, 5, . . . ) and even indexes (e.g., FH segment or slot indexes of 0, 2, 4 . . . ). In this manner, different DMRS positions within a slot or FH segment may be provided for every other slot or FH segment, which may improve DMRS balance. Thus, according to embodiment 2, a method may include receiving, by a user device (UE) from a network node (e.g., gNB), control information indicating a first demodulation reference signal (DMRS) symbol position configuration to be used for at least one resource entity (e.g., slot or FH segment) having an odd index, and control information indicating a second demodulation reference signal (DMRS) symbol position configuration to be used for at least one resource entity having an even index, the second DMRS symbol position configuration indicating one or more DMRS positions within a resource entity that are different from one or more DMRS positions indicated by the first DMRS symbol position configuration. The odd and even resource entities (e.g., odd and even slots or FH segments) may then be transmitted, based on the receive DMR symbol position configurations (for odd and even resource entities), e.g., having DMRs symbols provided at locations within the slot or FH segment, as indicated by the DMR symbol position configurations.

Figure 4:
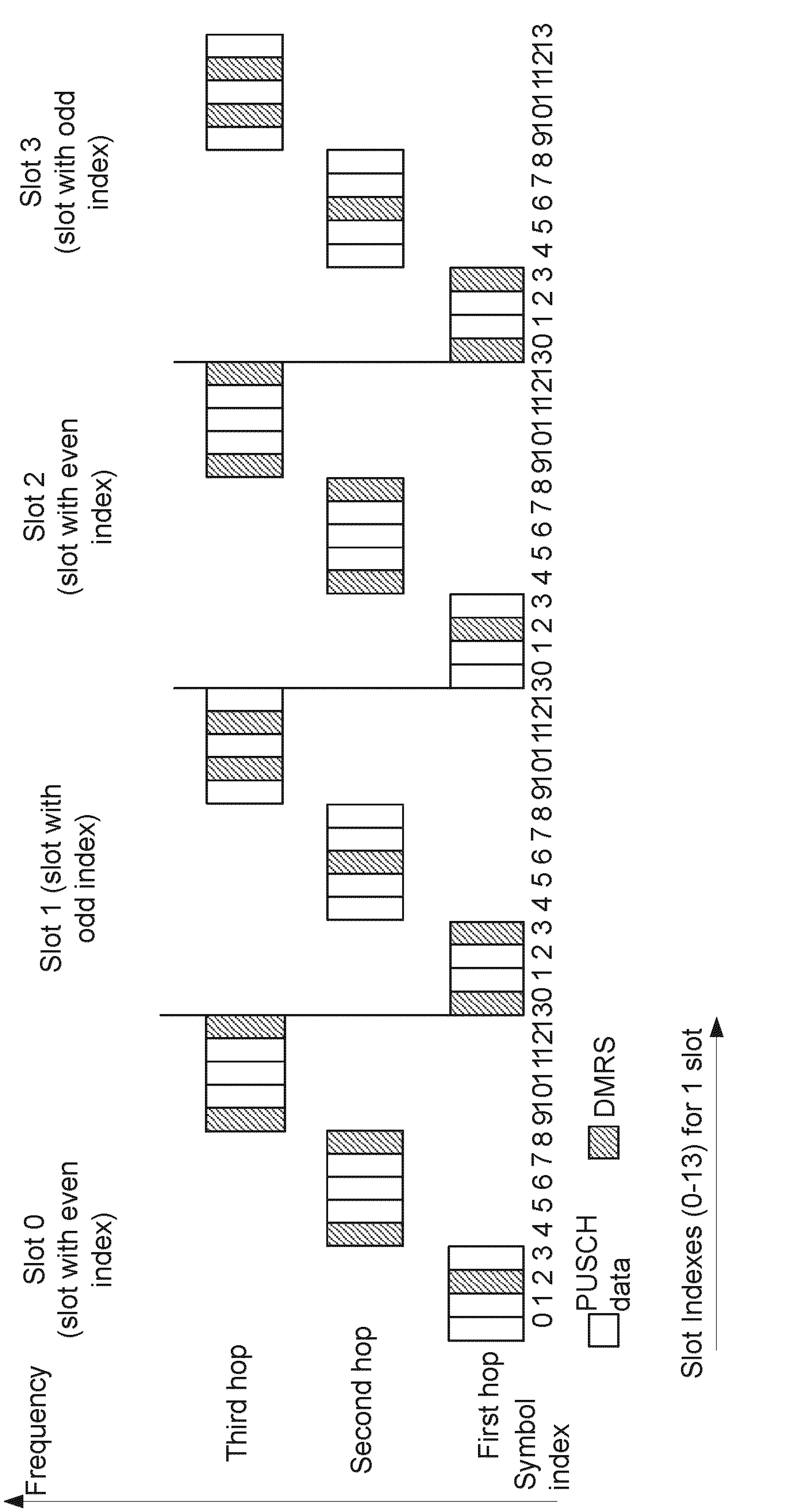
FIG. 4 is a diagram illustrating use of different demodulation reference signal (DMRS) symbol position configurations for odd and even indexed slots according to an example embodiment.

FIG. 4 is a diagram illustrating use of different demodulation reference signal (DMRS) symbol position configurations for odd and even indexed slots according to an example embodiment. Slot 0 and slot 2 are slots having an even index, while slot 1 and slot 3 are slots having an odd index. Control information may be received by the UE indicating that DMRS symbols should be provided at symbols 2, 4, 8, 9 and 13 for slots having even indexes (slots 0 and 2), and indicating that DMRS symbols should be provided at symbols 0, 3, 6, 10 and 12 for slots having an odd index (slots 1 and 3). These DMRS symbol positions are shown in the slots 0-3 of FIG. 4. In this manner, DMRS balance may be improved. Also, the circular shifting of both embodiments 1 and 2 may be used together or in combination.

The UE may be configured with two different DMRS allocation tables similar to Table 6.4.1.1.3-6 in 3GPP TS 38.214. Each table corresponds to DMRS allocation in odd or even slot number in the PUSCH repetition type A, for example. FIG. 4 shows an illustrative example, e.g., assuming that even slots use Table 6.4.1.1.3-6 in 3GPP TS 38.214 and odd slots use another new table such that $l_0=0$ and $\bar{l}=0$, 3; 2; and 1, 3 for the $1^{st}$, $2^{nd}$ and $3^{rd}$ hops, respectively. The gNB can configure which table is used for even/odd slot number or dynamically switch between the two tables. Alternatively, the circular shift of PUSCH (FH) segments in Embodiment 1 can be applied first. However, the DMRS allocation shown in FIG. 4 follows Embodiment 2.

Embodiment 3: As indicated for embodiment 3, a UE may perform a shift (e.g., circular shift) of a DMRS symbol position(s) within a resource entity (e.g., within a slot or FH segment) based on an offset amount (e.g., indicating a number of symbols the DMRS symbol position should be circularly shifted). The gNB may signal or indicate the offset amount to the UE. For example, an adjusted or shifted DMRS symbol position (e.g., within a slot or within a FH segment) may be obtained by shifting a previous or configured DMRS symbol position of at least one DMRS symbol by the offset amount of symbols within the resource entity (e.g., within the slot or within the FH segment). Thus, an example of embodiment 3 may include, performing (by the UE) a circular shift of a previous or configured DMRS symbol position of the at least one DMRS symbol by the offset amount of symbols within the frequency hop segment to obtain the adjusted (or shifted) DMRS signal position for the at least one DMRS symbol with the frequency hop segment.

One example approach to dynamically indicate the positions of DMRS symbols may be to use a bitmap of $$N_{BWP}^{PUSCH,s}$$

bits, where $$N_{BWP}^{PUSCH,s}$$

is the total number of PUSCH symbols in a slot. This approach however may require or consume a significant number of DCI (downlink control information) bits. To reduce the number of necessary DCI bits to perform the signalling, the UE may be preconfigured with a list of Q possible DMRS positions in RRC and use only $\lceil \log_2 Q \rceil$ bits in DCI to semi-statically select among the candidates. However, with this approach, different lists are needed for different number of DMRS symbols considered in a slot, which leads to a heavy RRC configurations.

Thus, in an example of embodiment 3, a DMRS position can be preconfigured (or configured). However, gNB may indicate a circular shift of the DMRS positions throughout the slot by using a field in DCI to indicate the offset amount, or shifting offset $D_{offset}$. The new DMRS symbol position $p_{new}$ for each DMRS symbol may be determined from the old (or previous or previously configured) symbol position $p_{old}$ by $p_{new}=(p_{old}+D_{offset}) \bmod 14$. With this solution, the gNB can change DMRS position in time domain without any additional RRC configuration. Since DMRS symbols are usually distributed in both first and second half of the slot (except front loaded DMRS), $D_{offset}$ can take the maximum value of 7, which requires 3 bits in DCI for indication, according to this illustrative example.

In case of frequency hopping, the cyclic shift can be applied per hop, i.e. $p_{new}=(p_{old}+D_{offset}) \bmod l_d$, where $l_d$ is PUSCH duration for one hop. In this case, the number of bits in DCI to indicate Doffset can be further reduced. Alternatively, the gNB can use a bitmap of M bits in DCI, where M is the number of frequency hops, to indicate which frequency hop(s) the cyclic shift should be applied.

Figure 5:
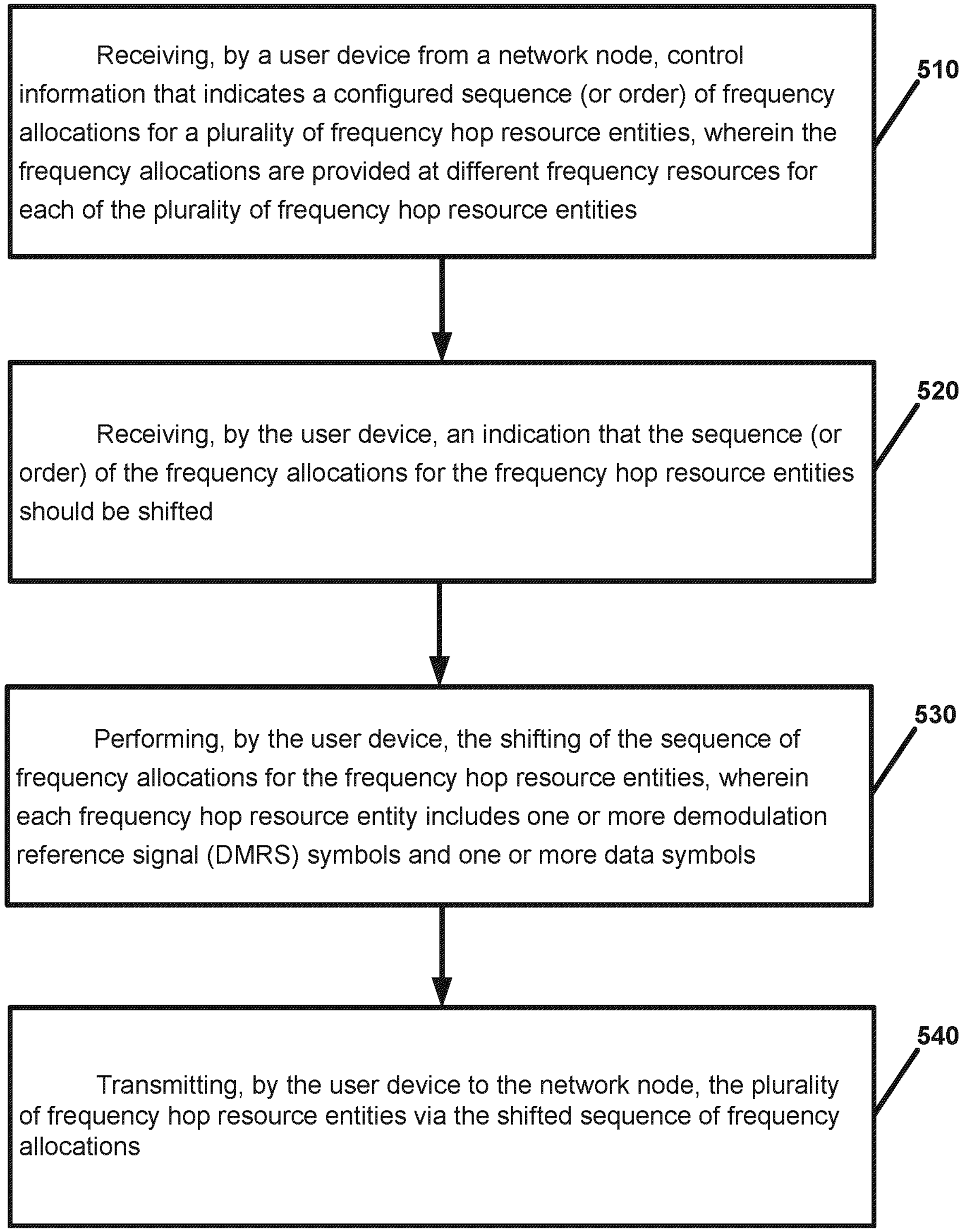
FIG. 5 is a flow chart illustrating operation of a user device (or UE) according to an example embodiment.

Example 1. FIG. 5 is a flow chart illustrating operation of a user device (or UE) according to an example embodiment. Operation 510 includes receiving, by a user device from a network node, control information that indicates a configured sequence (or order) of frequency allocations for a plurality of frequency hop resource entities, wherein the frequency allocations are provided at different frequency resources for each of the plurality of frequency hop resource entities. Operation 520 includes receiving, by the user device, an indication that the sequence (or order) of the frequency allocations for the frequency hop resource entities should be shifted. Operation 530 includes performing, by the user device, the shifting of the sequence of frequency allocations for the frequency hop resource entities, wherein each frequency hop resource entity includes one or more demodulation reference signal (DMRS) symbols and one or more data symbols. And operation 540 includes transmitting, by the user device to the network node, the plurality of frequency hop resource entities via the shifted sequence of frequency allocations.

Example 2. The method of Example 1, wherein a frequency allocation for each of the plurality of frequency hop resource entities remains unchanged after performing the shifting.

Example 3. The method of any of Examples 1-2 wherein each of the frequency hop resource entities comprises at least one of: a slot that includes a plurality of symbols, wherein at least two consecutive slots are allocated different frequency resources; or a frequency hop segment, wherein a slot comprises a plurality of frequency hop segments, wherein each frequency hop segment within the slot includes a subset of the symbols of the slot, and wherein frequency hop segments within the slot are allocated different frequency resources.

Example 4. The method of any of Examples 1-3, wherein the plurality of frequency hop resource entities comprise a plurality of slots, each slot including a plurality of symbols including at least one or more demodulation reference signal (DMRS) symbols and one or more data symbols, wherein inter-slot frequency hopping is performed by the user device for the transmission of the plurality of slots in which different frequency allocations are provided for each of the plurality of slots; wherein the adjusting comprises circular shifting the sequence or order of frequency allocations for the plurality of slots.

Example 5. The method of any of Examples 1-4, wherein the plurality of frequency hop resource entities comprise a plurality frequency hop segments within a slot, wherein each frequency hop segment includes a plurality of symbols including one or more demodulation reference signal (DMRS) symbols and one or more data symbols, wherein intra-slot frequency hopping is performed by the user device for the transmission the plurality of frequency hop segments of the slot in which different frequency allocations are provided for each of the plurality of frequency hop segments; wherein the adjusting comprises circular shifting the sequence or order of frequency allocations for the plurality of consecutive frequency hop segments within the slot.

Example 6. The method of any of Examples 1-5, wherein the user device performs both inter-slot frequency hopping for a transmission of a plurality of slots in which different frequency allocations are provided for each of the plurality of slots, and intra-slot frequency hopping for a transmission of a plurality of frequency hop segments in each of the plurality of slots in which different frequency allocations are provided for each of the plurality of frequency hop segments within at least one slot of the plurality of slots.

Example 7. The method of Example 6, wherein the adjusting comprises both performing a circular shifting a sequence or order of frequency allocations for the plurality of slots, and a circular shifting a sequence or order of frequency allocations for the plurality of frequency hop segments within at least one of the slots.

Example 8. The method of any of Examples 6-7, wherein the frequency allocations of adjacent frequency hop segments for adjacent slots use the same frequency resources.

Example 9. The method of any of Examples 1-8, wherein the receiving an indication comprises: receiving, by the user device, a circular shift flag set to enabled or true that indicates that the sequence (or order) of the frequency allocations for the frequency hop resource entities, of resources that have been scheduled for uplink transmission, should be shifted.

Example 10. The method of Example 4, further comprising: receiving, by the user device, control information indicating a subset of the plurality of consecutive slots; and wherein the circular shifting comprises circular shifting of the sequence of frequency allocations only for the indicated subset of the plurality of slots.

Example 11. The method of Example 5, further comprising: receiving, by the user device, control information indicating a subset of the plurality of frequency hop segments of the slot; and wherein the circular shifting comprises circular shifting of the sequence of frequency allocations only for the indicated subset of the plurality of frequency hop segments of the slot.

Example 12. The method of Example 1, wherein the performing the shifting of the sequence of frequency allocations for the frequency hop resource entities cause each of the frequency hop resource entities to be shifted by a frequency hop resource entity position and to use a shifted or different frequency allocation.

Example 13. FIG. 6 is a flow chart illustrating operation of a user device or UE according to another example embodiment. Operation 610 includes receiving, by a user device from a network node in a wireless network, an indication that a time-domain sequence (or order) of frequency hop resource entities should be shifted, wherein each frequency hop resource entity is configured with a frequency allocation according to a sequence or order of frequency allocations. Operation 620 includes performing, by the user device, a shifting of the frequency hop resource entities, wherein each frequency hop resource entity includes one or more demodulation reference signal (DMRS) symbols and one or more data symbols, wherein the shifting causes each of the frequency hop resource entities to be shifted by one frequency hop resource position and to be allocated a different frequency allocation. And, operation 630 includes transmitting, by the user device to the network node, the plurality of shifted frequency hop resource entities.

Example 14. The method of Example 13, wherein the performing a shifting of the frequency hop resource entities causes each frequency resource entity to be allocated different frequency resources as compared to before the shifting, and the shifting also causes a change in a time order of the frequency resource entities.

Example 15. The method of any of Examples 13-14, wherein the frequency hop resource entities comprise frequency hop segments within a slot, wherein the performing a shifting of the frequency hop resource entities comprises performing a circular shifting of the frequency hop segments within the slot to cause each frequency hop segment within the slot to be allocated different frequency resources as compared to before the shifting, and the shifting also causes a change in a time order of the frequency hop segments within the slot.

Example 16. The method of Example 13 wherein each of the frequency hop resource entities comprise at least one of: a slot that includes a plurality of symbols, wherein at least two consecutive slots are allocated different frequency resources; or a frequency hop segment, wherein a slot comprises a plurality of frequency hop segments, wherein each frequency hop segment within the slot includes a subset of the symbols of the slot, and wherein frequency hop segments within the slot are allocated different frequency resources.

Example 17. The method of Example 13, wherein each of the frequency hop resource entities comprises a slot that includes a plurality of symbols, wherein at least two consecutive slots are allocated different frequency resources, wherein the performing comprises: performing, by the user device, a circular shifting of the plurality of slots, wherein each slot includes one or more demodulation reference signal (DMRS) symbols and one or more data symbols, wherein the circular shifting causes each of the plurality of slots to be shifted by one slot position and to be allocated a different frequency allocation.

Example 18. The method of Example 13, wherein each of the frequency hop resource entities comprises a frequency hop segment, wherein a slot comprises a plurality of frequency hop segments, wherein each frequency hop segment within the slot includes a subset of the symbols of the slot, and wherein the frequency hop segments within the slot are allocated different frequency resources, wherein the performing comprises: performing, by the user device, a circular shifting of the plurality of frequency hop segments, wherein each frequency hop segment includes one or more demodulation reference signal (DMRS) symbols and one or more data symbols, wherein the circular shifting causes each of the plurality of frequency hop segments to be shifted by one frequency hop segment position within the slot and to be allocated a different frequency allocation for intra-slot frequency hopping.

Example 19. The method of Example 13, further comprising: selecting, by the user device after the shifting has been performed, a frequency hop resource entity that has been shifted into a first frequency hop resource entity position within the time-domain sequence (or order) of frequency hop resource entities; and moving, by the user device prior to the transmitting, a first DMRS symbol in time domain of the selected frequency hop resource entity to a fixed symbol position within the selected frequency hop resource entity.

Example 20. The method of Example 13, wherein each of the frequency hop resource entities comprises a frequency hop segment, wherein a slot comprises a plurality of frequency hop segments, wherein each frequency hop segment within the slot includes a subset of the symbols of the slot, the method further comprising: selecting, by the user device after the shifting has been performed, a frequency hop segment that has been shifted into a first frequency hop segment position within the time-domain sequence (or order) of frequency hop segments within the slot; and moving, by the user device prior to the transmitting, a first DMRS symbol (in time domain) of the selected frequency hop segment to a fixed symbol position within the selected frequency hop segment.

Example 21. The method of Example 13, wherein each of the frequency hop resource entities comprises a slot, the method further comprising: receiving, by the user device, control information indicating a subset of the plurality of slots; and wherein the performing a shifting comprises performing a circular shifting of only the indicated subset of slots.

Example 22. The method of Example 13, wherein each of the frequency hop resource entities comprises a frequency hop segment, the method further comprising: receiving, by the user device, control information indicating a subset of the plurality of frequency hop segments within a slot; and wherein the performing a shifting comprises performing a circular shifting of only the indicated subset of frequency hop segments within the slot.

Example 23. FIG. 7 is a flow chart illustrating operation of a user device according to another example embodiment. Operation 710 includes receiving, by a user device from a network node, control information indicating a first demodulation reference signal (DMRS) symbol position configuration to be used for at least one resource entity having an odd index, and control information indicating a second demodulation reference signal (DMRS) symbol position configuration to be used for at least one resource entity having an even index, the second DMRS symbol position configuration indicating one or more DMRS positions within a resource entity that are different from one or more DMRS positions indicated by the first DMRS symbol position configuration. Operation 720 includes transmitting, by the user device to the network node via a resource entity having an odd index, at least one DMRS symbol provided at a DMRS symbol position indicated by the first DMRS symbol position configuration. And, operation 730 includes transmitting, by the user device to the network node via a resource entity having an even index, at least one DMRS symbol provided at a DMRS symbol position indicated by the second DMRS symbol position configuration.

Example 24. The method of Example 23, wherein the resource entity comprises at least one of: a slot having either an odd or even index; a physical uplink shared channel (PUSCH) of a slot, wherein the slot has either an odd or even index; or a frequency hop segment, of a plurality of frequency hop segments within a slot in which intra-slot frequency hopping is performed by the user device, wherein each frequency hop segment has either an odd or even index.

Example 25. The method of Example 23 wherein: the first DMRS symbol position configuration comprises control information identifying a first table that indicates a DMRS allocation or DMRS symbol positions for at least one slot having an odd index; and the second DMRS symbol position configuration comprises control information identifying a second table that indicates a DMRS allocation or DMRS symbol positions within at least one slot having an even index.

Example 26. The method of Example 23, wherein the control information indicates a first demodulation reference signal (DMRS) symbol position configuration to be used for at least one slot having an odd index, and control information indicating a second demodulation reference signal (DMRS) symbol position configuration to be used for at least one even numbered slot, the second DMRS symbol position configuration indicating one or more DMRS positions within a slot that are different from one or more DMRS symbol positions indicated by the first DMRS symbol position configuration.

Example 27. The method of Example 23, wherein the control information indicates a first demodulation reference signal (DMRS) symbol position configuration to be used for at least one frequency hop segment, within a slot, having an odd index, and a second demodulation reference signal (DMRS) symbol position configuration to be used for at least one frequency hop, segment within the slot, having an even index, the second DMRS symbol position configuration indicating one or more DMRS positions within a frequency hop segment that are different from one or more DMRS positions that are indicated by the first DMRS symbol position configuration.

Figure 8:
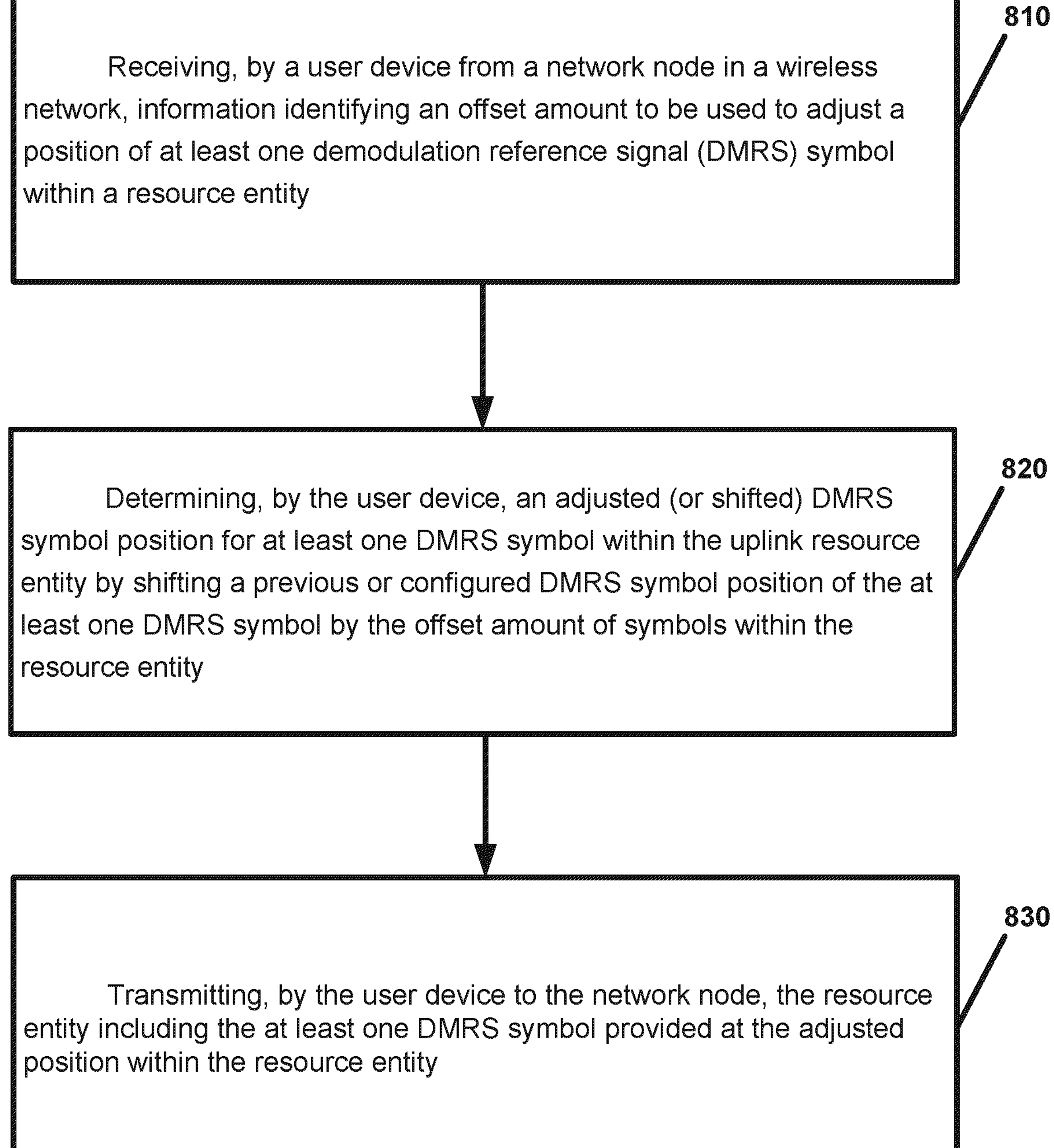
FIG. 8 is a flow chart illustrating operation of a user device according to another example embodiment.

Example 28. FIG. 8 is a flow chart illustrating operation of a user device according to another example embodiment. Operation 810 includes receiving, by a user device from a network node in a wireless network, information identifying an offset amount to be used to adjust a position of at least one demodulation reference signal (DMRS) symbol within a resource entity. Operation 820 includes determining, by the user device, an adjusted (or shifted) DMRS symbol position for at least one DMRS symbol within the uplink resource entity by shifting a previous or configured DMRS symbol position of the at least one DMRS symbol by the offset amount of symbols within the resource entity. And, operation 830 includes transmitting, by the user device to the network node, the resource entity including the at least one DMRS symbol provided at the adjusted position within the resource entity.

Example 29. The method of Example 28, wherein the information identifying the offset amount comprises at least one of: information indicating the offset amount; or information indicating one of a plurality of preconfigured possible offset amounts.

Example 30. The method of Example 28, wherein the resource entity comprises at least one of: a slot having either an odd or even index; or a frequency hop segment, of a plurality of frequency hop segments within a slot in which intra-slot frequency hopping is performed by the user device, wherein each frequency hop segment has either an odd or even index, and each frequency hop segment within the slot is allocated a different set of frequency resources.

Example 31. The method of Example 28, wherein the resource entity comprises a slot having either an odd or even index; and wherein the determining an adjusted DMRS symbol position comprises performing a circular shift of a previous or configured DMRS symbol position of the at least one DMRS symbol by the offset amount of symbols within the slot to obtain the adjusted (or shifted) DMRS signal position for the at least one DMRS symbol within the slot.

Example 32. The method of Example 28, wherein the resource entity comprises a frequency hop segment, of a plurality of frequency hop segments within a slot in which intra-slot frequency hopping is performed by the user device, wherein each frequency hop segment within the slot has either an odd or even index; and wherein the determining an adjusted DMRS symbol position comprises performing a circular shift of a previous or configured DMRS symbol position of the at least one DMRS symbol by the offset amount of symbols within the frequency hop segment to obtain the adjusted (or shifted) DMRS signal position for the at least one DMRS symbol with the frequency hop segment.

Example 33. A method may include determining, by the user device, a number of symbols for each of a plurality of frequency hop segments for intra-slot frequency hopping, including: determining a first number of symbols for a first frequency hop segment by dividing a number of symbols of the slot by a number of frequency hop segments, and rounding down to a closest integer; allocating the first number of symbols to the first frequency hop segment; performing the following for each of the remaining frequency hop segments, except that last segment of the slot: determining an updated number of symbols by decreasing the number of symbols of the slot by a previously allocated number, and determining an updated number of frequency hop segments by decreasing the number of frequency hop segments by 1; determining a number of symbols for a next frequency hop segment by dividing the updated number of symbols of the slot by the update number of frequency hop segments, and rounding down to a closest integer; and allocating one or more remaining symbols to a last frequency hop segment of the slot.

Example 34. A method comprising: determining, by the user device, a number of symbols for each of a plurality of frequency hop segments for intra-slot frequency hopping, including: determining a first number of symbols for a first frequency hop segment by dividing a number of symbols of the slot by a number of frequency hop segments, and rounding down to a closest integer; allocating the first number of symbols to the first frequency hop segment; and allocating a remaining, unallocated, number of symbols of the slot evenly or uniformly among a remaining frequency hop segments.

Example 35. A method comprising: determining, by the user device, a number of symbols for each of a plurality of frequency hop segments of a slot for intra-slot frequency hopping, including: determining a number of symbols for each of the frequency hop segments, except a last frequency hop segment of the slot, by dividing a number of symbols of the slot by a number of frequency hop segments, and rounding down to a closest integer; and allocating a remaining number of symbols to the last frequency hop segment of the slot.

Example 36. A method comprising: determining, by the user device, a resource block offset that indicates a resource offset in frequency domain between a starting position of frequency resources allocated to a first frequency hop resource entity and a starting position of frequency resources allocated to a last frequency hop resource entity, wherein a starting position of frequency resources allocated to of one or more remaining frequency hop resource entities are distributed evenly between the starting position of the frequency resources allocated to the first frequency hop resource entity and the starting position of the last frequency hop resource entity; and determining, by the user device, frequency resources allocated to each of a plurality of frequency hop resource entities of a slot, based on the resource offset.

Example 37. The method of Example 36, wherein the resource entity comprises at least one of: a slot having either an odd or even index; or a frequency hop segment, of a plurality of frequency hop segments within a slot in which intra-slot frequency hopping is performed by the user device, wherein each frequency hop segment has either an odd or even index, and each frequency hop segment within the slot is allocated a different set of frequency resources.

Example 38. The method of any of Examples 36-37, wherein the determining the resource block offset comprises: receiving, by the user device from a network node, information indicating the resource block offset.

Example 39. An apparatus comprising means for performing the method of any of Examples 1-38.

Example 40. A non-transitory computer-readable storage medium comprising instructions stored thereon that, when executed by at least one processor, are configured to cause a computing system to perform the method of any of Examples 1-38.

Example 41. An apparatus comprising: at least one processor; and at least one memory including computer program code; the at least one memory and the computer program code configured to, with the at least one processor, cause the apparatus at least to perform the method of any of Examples 1-38.

Figure 9:
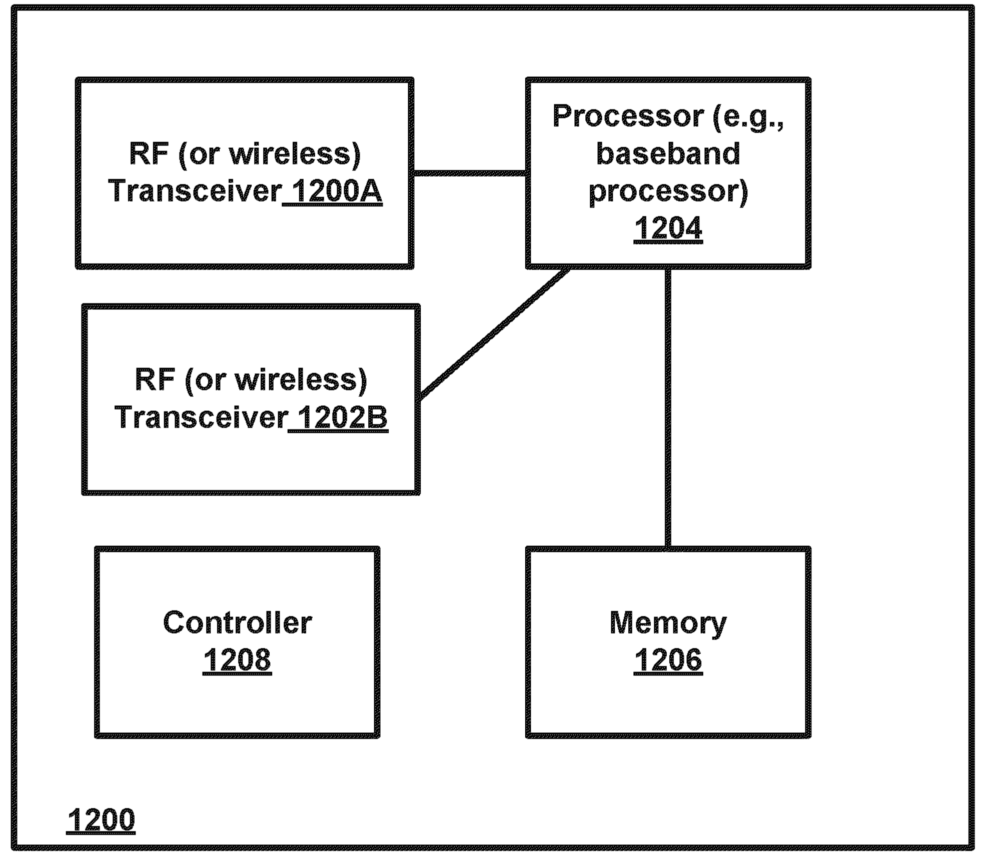
FIG. 9 is a block diagram of a wireless station or node (e.g., AP, BS, RAN node, UE or user device, or other network node) according to an example embodiment.

FIG. 9 is a block diagram of a wireless station (e.g., AP, BS or user device/UE, or other network node) 1200 according to an example embodiment. The wireless station 1200 may include, for example, one or more (e.g., two as shown in FIG. 9) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 9, a controller (or processor) 1208 may execute software and instructions, and may provide overall control for the station 1200, and may provide control for other systems not shown in FIG. 9, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems.

Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:

receiving, with a user device from a network node, control information that indicates a configured sequence or order of frequency allocations for a plurality of frequency hop resource entities, wherein the frequency allocations are at different frequency resources for each of the plurality of frequency hop resource entities, and wherein the plurality of frequency hop resource entities comprises a plurality of frequency hop segments within a slot;

receiving, with the user device, an indication to shift the configured sequence or the order of the frequency allocations for each of the plurality of frequency hop resource entities;

performing, with the user device, a shifting of the configured sequence or the order of the frequency allocations for the plurality of frequency hop resource entities to generate a shifted sequence of the frequency allocations, wherein each of the plurality of frequency hop segments includes a plurality of symbols including one or more demodulation reference signal symbols and one or more data symbols, wherein the user device performs intra-slot frequency hopping for a transmission of the plurality of frequency hop segments within the slot in which the plurality of frequency hop segments uses different frequency allocations, and wherein the shifting comprises performing a circular shifting of the configured sequence or the order of the frequency allocations for each of the plurality of frequency hop segments within the slot; and transmitting, with the user device to the network node, the plurality of frequency hop resource entities with the shifted sequence of frequency allocations.

2. The method of claim 1, wherein the frequency allocations for the plurality of frequency hop resource entities remain unchanged after performing the shifting.

3. The method of claim 1, wherein each of the plurality of frequency hop segments within the slot includes a subset of the symbols of the slot, and wherein each of the plurality of frequency hop segments within the slot is allocated different frequency resources.

4. The method of claim 1, wherein the user device further performs inter-slot frequency hopping for a transmission of a plurality of slots, including the slot, in which different frequency allocations are provided for the plurality of slots.

5. The method of claim 4, wherein the shifting further comprises performing the circular shifting of the configured sequence or the order of frequency allocations for the plurality of slots.

6. The method of claim 4, wherein the frequency allocations of adjacent frequency hop segments, in adjacent slots of the plurality of slots, use same frequency resources.

7. The method of claim 1, wherein the receiving the indication to shift the configured sequence or the order of the frequency allocations comprises:

receiving, with the user device, a circular shift flag set to enabled or true that indicates to shift the configured sequence or the order of the frequency allocations for each of the plurality of frequency hop resource entities scheduled for uplink transmission.

8. The method of claim 1, wherein the control information further indicates a subset of the plurality of frequency hop segments of the slot; and wherein the shifting comprises the circular shifting of the configured sequence or the order of frequency allocations for the indicated subset of the plurality of frequency hop segments of the slot.

9. The method of claim 1, wherein performing the circular shifting of the configured sequence or the order of the frequency allocations for the plurality of frequency hop resource entities causes the plurality of frequency hop resource entities to shift to different frequency hop resource entity positions and to use a different frequency allocation.

10. A method comprising:

receiving, with a user device from a network node in a wireless network, control information comprising an indication to shift a time-domain sequence or order of a plurality of frequency hop resource entities, wherein the plurality of frequency hop resource entities comprises a plurality of frequency hop segments within a slot, and wherein each of the plurality of frequency hop resource entities is configured with a frequency allocation according to a sequence or order of frequency allocations;

performing, with the user device, a shifting of the plurality of frequency hop resource entities, wherein performing the shifting comprises performing a circular shifting of the plurality of frequency hop segments within the slot, wherein each of the plurality of frequency hop segments includes one or more demodulation reference signal symbols and one or more data symbols, and wherein the circular shifting causes:

the plurality of frequency hop segments to be shifted by one frequency hop resource position, each of the plurality of frequency hop segments within the slot to be allocated different frequency resources as compared to the frequency resources before the shifting, and a change in a time order of the plurality of frequency hop segments within the slot; and transmitting, with the user device to the network node, the plurality of shifted frequency hop segments.

11. The method of claim 10, wherein the plurality of frequency hop resource entities further comprises:

a plurality of slots including the slot, wherein each of the plurality of slots includes a plurality of symbols, wherein at least two consecutive slots in the plurality of slots are allocated different frequency resources, wherein the slot comprises the plurality of frequency hop segments, wherein each of the plurality of frequency hop segments within the slot includes a subset of the plurality of symbols of the slot, and wherein the plurality of frequency hop segments within the slot are allocated different frequency resources.

12. The method of claim 11, wherein the performing the shifting further comprises: performing, with the user device, a circular shifting of the plurality of slots including the slot, wherein the circular shifting causes each slot of the plurality of slots to be shifted with one slot position and to be allocated a different frequency allocation.

13. The method of claim 10, further comprising:

selecting, with the user device after the circular shifting, a frequency hop resource entity that has been shifted into a first frequency hop resource entity position within the time-domain sequence or the order of the plurality of frequency hop resource entities; and moving, with the user device prior to the transmitting, a first demodulation reference signal symbol in a time domain of the selected frequency hop resource entity to a fixed symbol position within the selected frequency hop resource entity.

14. The method of claim 10, wherein the plurality of frequency hop segments within the slot includes a subset of the symbols of the slot, the method further comprising:

selecting, with the user device after the shifting has been performed, a frequency hop segment from the plurality of frequency hop segments that has been shifted into a first frequency hop segment position within the time-domain sequence or the order of frequency hop segments within the slot; and moving, with the user device prior to the transmitting, a first demodulation reference signal symbol of the one or more demodulation reference signal symbols in time domain of the selected frequency hop segment to a fixed symbol position within the selected frequency hop segment.

15. The method of claim 10, wherein the control information further indicates a subset of the plurality of frequency hop segments within a slot; and wherein the performing a shifting comprises performing the circular shifting of the indicated subset of the plurality of frequency hop segments within the slot.

16. A non-transitory computer readable medium tangibly embodying a program of instructions executable by one or more processors for performing the method of claim 1.

17. An apparatus comprising:

at least one processor; and at least one non-transitory memory storing instructions that, when executed with the at least one processor, cause the apparatus to perform:

receiving, with a user device from a network node, control information that indicates a configured sequence or order of frequency allocations for a plurality of frequency hop resource entities, wherein the frequency allocations are at different frequency resources for each of the plurality of frequency hop resource entities, and wherein the plurality of frequency hop resource entities comprises a plurality of frequency hop segments within a slot;

receiving, with the user device, an indication to shift the configured sequence or the order of the frequency allocations for each of the plurality of frequency hop resource entities;

performing, with the user device, a shifting of the configured sequence or the order of the frequency allocations for the plurality of frequency hop resource entities to generate a shifted sequence of the frequency allocations, wherein each of the plurality of frequency hop segments includes a plurality of symbols including one or more demodulation reference signal symbols and one or more data symbols, wherein intra-slot frequency hopping is performed for a transmission of the plurality of frequency hop segments within the slot of a plurality of slots in which different frequency allocations are provided for the plurality of frequency hop segments, and wherein the shifting comprises performing a circular shifting of the configured sequence or the order of the frequency allocations for each of the plurality of frequency hop segments within the slot of the plurality of slots; and transmitting, with the user device to the network node, the plurality of frequency hop resource entities with the shifted sequence of frequency allocations.

* * * * *